US012641233B2

(12) United States Patent
Ikai et al.

(10) Patent No.: US 12,641,233 B2
(45) Date of Patent: May 26, 2026

(54) IMAGE DECODING APPARATUS AND IMAGE CODING APPARATUS

(71) Applicant: Sharp Kabushiki Kaisha, Sakai City (JP)

(72) Inventors: Tomohiro Ikai, Sakai City (JP); Yukinobu Yasugi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/795,262

(22) Filed: Aug. 6, 2024

(65) Prior Publication Data

US 2024/0397046 A1    Nov. 28, 2024

Related U.S. Application Data

(63) Continuation of application No. 18/139,547, filed on Apr. 26, 2023, now Pat. No. 12,095,990, which is a
(Continued)

(30) Foreign Application Priority Data

Jun. 1, 2018    (JP) ................................. 2018-106506

(51) Int. Cl.
    *H04N 19/119*        (2014.01)
    *H04N 19/159*        (2014.01)
    (Continued)

(52) U.S. Cl.
    CPC ......... *H04N 19/119* (2014.11); *H04N 19/159* (2014.11); *H04N 19/172* (2014.11); *H04N 19/1883* (2014.11)

(58) Field of Classification Search
    CPC ...... H04N 19/11; H04N 19/119; H04N 19/13; H04N 19/159; H04N 19/172;
    (Continued)

(56) References Cited

U.S. PATENT DOCUMENTS

| 2015/0023405 A1* | 1/2015 | Joshi | .................... H04N 19/117 |
| | | | 375/240.02 |
| 2016/0105682 A1* | 4/2016 | Rapaka | .................. H04N 19/50 |
| | | | 375/240.12 |

(Continued)

FOREIGN PATENT DOCUMENTS

WO    WO-2017188739 A1 * 11/2017    ............. H04N 19/91

OTHER PUBLICATIONS

Ikai et al., "Image Decoding Apparatus and Image Coding Apparatus", U.S. Appl. No. 18/139,547, filed Apr. 26, 2023.

*Primary Examiner* — Behrooz M Senfi
(74) *Attorney, Agent, or Firm* — Keating & Bennett, LLP

(57)    ABSTRACT

Delay based on WPP processing is reduced. An image decoding apparatus (31) includes: a prediction image generation unit (308) by using decoded data from a first position to a second position, the first position being, in a CTU row immediately above a CTU row including a target CTU, identical to a position of the target CTU, the second position being a position one CTU forward relative to the first position; and an entropy decoding unit (301) that performs decoding of the target CTU by using the decoded data from the first position to the second position, the first position being, in the CTU row immediately above the CTU row including the target CTU, identical to the position of the target CTU, the second position being a position one CTU forward relative to the first position.

3 Claims, 20 Drawing Sheets

Related U.S. Application Data continuation of application No. 17/549,946, filed on Dec. 14, 2021, now Pat. No. 11,677,943, which is a continuation of application No. 17/059,278, filed as application No. PCT/JP2019/021585 on May 30, 2019, now Pat. No. 11,240,500.

(51) Int. Cl.
    *H04N 19/169*      (2014.01)
    *H04N 19/172*      (2014.01)

(58) Field of Classification Search
    CPC ............... H04N 19/174; H04N 19/176; H04N 19/1883; H04N 19/436; H04N 19/593; H04N 19/91; H04N 19/96
    USPC ..................................................... 375/240.02
    See application file for complete search history.

(56)                References Cited

U.S. PATENT DOCUMENTS

2018/0316934 A1*   11/2018   Nam ....................... H04N 19/46
2020/0404301 A1*   12/2020   Li ........................ H04N 19/176

* cited by examiner

INITIALIZE WITH
CABAC STATE AT
END TIME POINT
OF CTU = 0

| coding_tree_unit( ) { | Descriptor |
|---|---|
| xCtb = ( CtbAddrInRs % PicWidthInCtbsY )<<CtbLog2SizeY | |
| yCtb = ( CtbAddrInRs / PicWidthInCtbsY )<<CtbLog2SizeY | |
| if( slice_sao_luma_flag \|\| slice_sao_chroma_flag ) | |
| sao( xCtb >> CtbLog2SizeY, yCtb >> CtbLog2SizeY ) | |
| coding_quadtree( xCtb, yCtb, CtbLog2SizeY, 0 ) | |
| } | |

| coding_quadtree( x0, y0, log2CbSize, cqtDepth ) { | Descriptor |
|---|---|
| if( x0 + ( 1<<log2CbSize ) <= pic_width_in_luma_samples && y0 + ( 1<<log2CbSize ) <= pic_height_in_luma_samples && log2CbSize > MinCbLog2SizeY ) | |
| split_cu_flag[ x0 ][ y0 ] | ae(v) |
| if( split_cu_flag[ x0 ][ y0 ] ) { | |
| x1 = x0 + ( 1<<( log2CbSize − 1 ) ) | |
| y1 = y0 + ( 1<<( log2CbSize − 1 ) ) | |
| coding_quadtree( x0, y0, log2CbSize − 1, cqtDepth + 1 ) | |
| if( x1 < pic_width_in_luma_samples ) | |
| coding_quadtree( x1, y0, log2CbSize − 1, cqtDepth + 1 ) | |
| if( y1 < pic_height_in_luma_samples ) | |
| coding_quadtree( x0, y1, log2CbSize − 1, cqtDepth + 1 ) | |
| if( x1 < pic_width_in_luma_samples && y1 < pic_height_in_luma_samples ) | |
| coding_quadtree( x1, y1, log2CbSize − 1, cqtDepth + 1 ) | |
| } else | |
| coding_binarytree( x0, y0, log2CbSize, log2CbSize, 0 ) | |
| } | |

FIG. 11

| coding_tree_unit( ) { | Descriptor |
|---|---|
| xCtb = ( CtbAddrInRs % PicWidthInCtbsY )<<CtbLog2SizeY | |
| yCtb = ( CtbAddrInRs / PicWidthInCtbsY )<<CtbLog2SizeY | |
| if( slice_sao_luma_flag \|\| slice_sao_chroma_flag ) | |
| sao( xCtb >> CtbLog2SizeY, yCtb >> CtbLog2SizeY ) | |
| coding_quadtree( xCtb, yCtb, CtbLog2SizeY, 0 ) | |
| } | |

| coding_quadtree( x0, y0, log2CbSize, cqtDepth ) { | Descriptor |
|---|---|
| if( x0 + ( 1<<log2CbSize ) <= pic_width_in_luma_samples &&<br>y0 + ( 1<<log2CbSize ) <= pic_height_in_luma_samples &&<br>log2CbSize > MinCbLog2SizeY ) | |
| split_cu_flag[ x0 ][ y0 ] | ac(v) |
| if( split_cu_flag[ x0 ][ y0 ] ) { | |
| x1 = x0 + ( 1<<( log2CbSize − 1 ) ) | |
| y1 = y0 + ( 1<<( log2CbSize − 1 ) ) | |
| if (alt_cu_scan_order_flag == 0) {  ←SYN1410 | |
| coding_quadtree( x0, y0, log2CbSize − 1, cqtDepth + 1 ) | |
| if( x1 < pic_width_in_luma_samples ) | |
| coding_quadtree( x1, y0, log2CbSize − 1, cqtDepth + 1 ) | |
| if( y1 < pic_height_in_luma_samples ) | |
| coding_quadtree( x0, y1, log2CbSize − 1, cqtDepth + 1 ) | |
| if( x1 < pic_width_in_luma_samples && y1 < pic_height_in_luma_samples ) | |
| coding_quadtree( x1, y1, log2CbSize − 1, cqtDepth + 1 ) | |
| } else { | |
| coding_quadtree( x0, y0, log2CbSize − 1, cqtDepth + 1 ) | |
| if( y1 < pic_height_in_luma_samples ) | |
| coding_quadtree( x0, y1, log2CbSize − 1, cqtDepth + 1 ) | |
| if( x1 < pic_width_in_luma_samples ) | |
| coding_quadtree( x1, y0, log2CbSize − 1, cqtDepth + 1 ) | |
| if( x1 < pic_width_in_luma_samples && y1 < pic_height_in_luma_samples ) | |
| coding_quadtree( x1, y1, log2CbSize − 1, cqtDepth + 1 ) | |
| } | |
| } else | |
| coding_binarytree( x0, y0, log2CbSize, log2CbSize, 0 ) | |
| } | |

SYN1411

FIG. 12

| coding_binarytree( x0, y0, log2CbWidth, log2CbHeight, cbtDepth ) { | Descriptor |
|---|---|
| if ( ( log2CbHeight > log2MinBTSize ‖ log2CbWidth > log2MinBTSize ) && log2CbWidth <= log2MaxBTSize && log2CbHeight <= log2MaxBTSize && cbtDepth < maxBTDepth ) | |
|    split_bt_flag [ x0 ][ y0 ] | ae(v) |
|   if (split_bt_flag) { | |
|     if ( (log2CbHeight > log2MinBTSize) && (log2CbWidth > log2MinBTSize) ) | |
|      split_bt_dir [x0][y0] | ae(v) |
|     if( split_bt_dir[ x0 ][ y0 ] == 0 ) { | |
|      x1 = x0 + ( 1<<( log2CbWidth − 1 ) ) | |
|      coding_binarytree( x0, y0, log2CbWidth − 1, log2CbHeight, cqtDepth + 1 ) | |
|      if( x1 < pic_width_in_luma_samples ) | |
|       coding_binarytree( x1, y0, log2CbWidth − 1, log2CbHeight, cqtDepth + 1 ) | |
|     else if( split_bt_dir[ x0 ][ y0 ] == 1 ) { | |
|      y1 = y0 + ( 1<<( log2CbHeight − 1 ) ) | |
|      coding_binarytree( x0, y0, log2CbWidth, log2CbHeight − 1, cqtDepth + 1 ) | |
|      if( y1 < pic_height_in_luma_samples ) | |
|       coding_binarytree( x0, y1, log2CbWidth, log2CbHeight − 1, cqtDepth + 1 ) | |
|     } | |
|   else | |
|     coding_unit( x0, y0, log2CbWidth, log2CbHeight ) | |
| } | |

FIG. 13

PICTURE P            TARGET CTU        PICTURE Q

PICTURE P

TARGET CTU

PICTURE Q

IMAGE DECODING APPARATUS AND IMAGE CODING APPARATUS

TECHNICAL FIELD

The embodiments of the present disclosure relate to an image decoding apparatus and an image coding apparatus.

BACKGROUND ART

A video coding apparatus which generates coded data by coding a video, and a video decoding apparatus which generates decoded images by decoding the coded data are used for efficient transmission or recording of videos.

For example, specific video coding schemes include schemes proposed in H.264/AVC and High-Efficiency Video Coding (HEVC), and the like.

In such a video coding scheme, images (pictures) constituting a video are managed in a hierarchical structure including slices obtained by splitting an image, Coding Tree Units (CTUs) obtained by splitting a slice, units of coding (Coding Units; which will be referred to as CUs) obtained by splitting a coding tree unit, prediction units (PUs) which are blocks obtained by splitting a coding unit, and transform units (TUs), and are coded/decoded for each CU.

In such a video coding scheme, usually, a prediction image is generated based on a local decoded image that is obtained by coding/decoding an input image (a source image), and prediction residual components (which may be referred to also as "difference images" or "residual images") obtained by subtracting the prediction image from the input image are coded. Generation methods of prediction images include an inter-picture prediction (an inter prediction) and an intra-picture prediction (intra prediction).

In addition, NPL 1 is exemplified as a recent technique for video coding and decoding.

Further, HEVC described above includes processing referred to as Wavefront Parallel Processing (WPP), whereby coding and decoding processing of each CTU row is performed with each of the coding processing and the decoding processing being shifted by two CTUs.

CITATION LIST

Non Patent Literature

NPL 1: "Algorithm Description of Joint Exploration Test Model 5", JVET-E1001, Joint Video-Exploration Team (JVET) of ITU-T SG 16 WP 3 and ISO/IEC JTC 1/SC 29/WG 11, 12-20 Jan. 2017

Summary of Disclosure

Technical Problem

In WPP described above, the coding and decoding processing is performed with each CTU row being sequentially shifted by two CTUs. Thus, there is a problem that the processing is further delayed as the number of CTU rows is further increased. In addition, there is also a problem that a delay amount is further increased as the CTU size is further increased.

Solution to Problem

In order to solve the problems described above, an image decoding apparatus according to one aspect of the present disclosure is an image decoding apparatus for dividing a picture into multiple CTU rows and decoding each of the multiple CTU rows sequentially from top. The image decoding apparatus includes: a prediction image generation unit configured to generate, in a case of generating a prediction image, a prediction image of a target CTU by using decoded data of CTUs from a first position to a second position, the first position being, in a CTU row (second CTU row) immediately above a first CTU row including the target CTU, identical to a position of the target CTU, the second position being a position a prescribed fixed number of CTUs forward relative to the first position; and a decoder configured to decode the target CTU by using information of the CTUs from the first position to the second position, the first position being, in the second CTU row, identical to the position of the target CTU, the second position being the position the prescribed fixed number of the CTUs forward relative to the first position.

Advantageous Effects of Disclosure

According to one aspect of the present disclosure, an effect that delay based on WPP processing can be reduced is exerted.

BRIEF DESCRIPTION OF DRAWINGS

FIG. 11 illustrates a syntax example of block split according to HEVC.

FIG. 12 is a diagram illustrating a syntax example of block split according to the present embodiment.

FIG. 13 is a diagram illustrating a syntax example of binary tree split.

DESCRIPTION OF EMBODIMENTS

First Embodiment

Hereinafter, embodiments of the present disclosure will be described with reference to the drawings.

Figure 20:
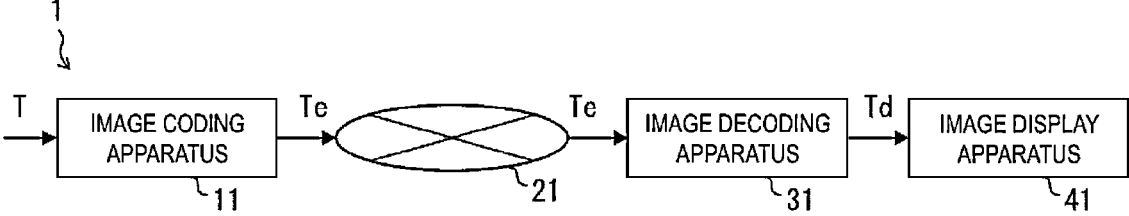
FIG. 20 is a schematic diagram illustrating a configuration of an image transmission system according to the present embodiment.

FIG. 20 is a schematic diagram illustrating a configuration of an image transmission system 1 according to the present embodiment.

The image transmission system 1 is a system in which codes of a coding target image are transmitted, the transmitted codes are decoded, and thus an image is displayed. The image transmission system 1 includes an image coding apparatus (video coding apparatus) 11, a network 21, an image decoding apparatus (video decoding apparatus) 31, and an image display apparatus 41.

An image T indicating an image of a single layer or multiple layers is input to the image coding apparatus 11. A layer is a concept used to distinguish multiple pictures in a case that there are one or more pictures constituting a certain time. For example, coding identical pictures in multiple layers having different image qualities and resolutions is scalable coding, and coding pictures having different viewpoints in multiple layers is view scalable coding. In a case that a prediction (an inter-layer prediction, an inter-view prediction) between pictures in multiple layers is performed, coding efficiency greatly improves. In addition, in a case that a prediction is not performed (simulcast), coded data can be compiled.

The network 21 transmits a coding stream Te generated by the image coding apparatus 11 to the image decoding apparatus 31. The network 21 is the internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coding stream Te is recorded, such as a Digital Versatile Disc (DVD) or a Blue-ray Disc (BD).

The image decoding apparatus 31 decodes each of the coding streams Te transmitted from the network 21 and generates one or each of multiple decoded images Td.

The image display apparatus 41 displays all or part of the one or multiple decoded images Td generated by the image decoding apparatus 31. For example, the image display apparatus 41 includes a display device such as a liquid crystal display and an organic Electro-luminescence (EL) display. In addition, in spatial scalable coding and SNR scalable coding, in a case that the image decoding apparatus 31 and the image display apparatus 41 have a high processing capability, an enhanced layer image having high image quality is displayed, and in a case that the apparatuses have a lower processing capability, a base layer image which does not require as high a processing capability and display capability as an enhanced layer is displayed.

Operator

Operators used in the present specification will be described below.

>> is a right bit shift, << is a left bit shift, & is a bitwise AND, | is a bitwise OR, and |= is an OR assignment operator.

x? y:z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

Structure of Coding Stream Te

Prior to the detailed description of the image coding apparatus 11 and the image decoding apparatus 31 according to the present embodiment, a data structure of the coding stream Te generated by the image coding apparatus 11 and decoded by the image decoding apparatus 31 will be described.

Figure 1:
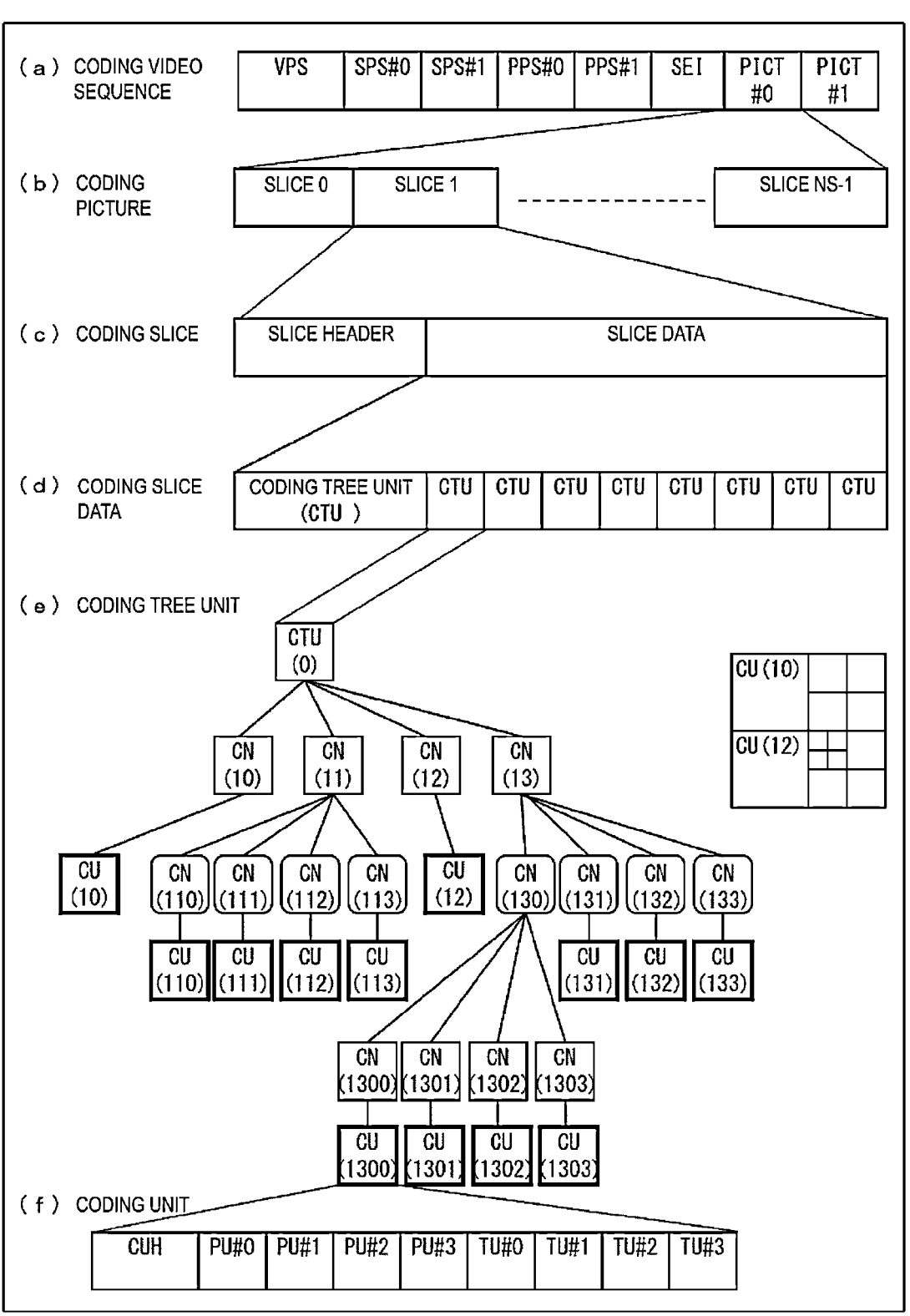
FIG. 1 is a diagram illustrating a hierarchical structure of data of a coding stream according to the present embodiment.

FIG. 1 is a diagram illustrating a hierarchical structure of data of the coding stream Te. The coding stream Te includes a sequence and multiple pictures constituting the sequence illustratively. (a) to (f) of FIG. 1 are diagrams illustrating a coding video sequence defining a sequence SEQ, a coding picture prescribing a picture PICT, a coding slice prescribing a slice S, a coding slice data prescribing slice data, a coding tree unit included in the coding slice data, and a Coding Unit (CU) included in each coding tree unit, respectively.

Coding Video Sequence

In the coding video sequence, a set of data referred to by the image decoding apparatus 31 to decode the sequence SEQ to be processed is defined. As illustrated in (a) of FIG. 1, the sequence SEQ includes a Video Parameter Set, a Sequence Parameter Set SPS, a Picture Parameter Set PPS, a picture PICT, and Supplemental Enhancement Information SEI. Here, a value indicated after # indicates a layer ID. Although an example in which there is coded data of #0 and #1, that is, layer 0 and layer 1, is illustrated in FIG. 1, types of layers and the number of layers are not limited thereto.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the image decoding apparatus 31 to decode a target sequence is defined. For example, a width and a height of a picture are defined. Note that multiple SPSs may exist. In that case, any of multiple SPSs is selected from the PPS.

In the picture parameter set PPS, a set of coding parameters referred to by the image decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Picture

In the coding picture, a set of data referred to by the image decoding apparatus 31 to decode the picture PICT to be processed is defined. As illustrated in (b) of FIG. 1, the picture PICT includes slices S0 to $S_{NS-1}$ (NS is the total number of slices included in the picture PICT).

Note that in a case not necessary to distinguish the slices S0 to $S_{NS-1}$ below, subscripts of reference signs may be omitted and described. In addition, the same applies to other data with subscripts included in the coding stream Te which will be described below.

Coding Slice

In the coding slice, a set of data referred to by the image decoding apparatus 31 to decode the slice S to be processed is defined. As illustrated in (c) of FIG. 1, the slice S includes a slice header SH and a slice data SDATA.

The slice header SH includes a coding parameter group referred to by the image decoding apparatus 31 to determine a decoding method for a target slice. Slice type specification information (slice_type) indicating a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like.

Note that, the slice header SH may include a reference to the picture parameter set PPS (pic_parameter_set_id) included in the coding video sequence.

Coding Slice Data

In the coding slice data, a set of data referred to by the image decoding apparatus 31 to decode the slice data SDATA to be processed is defined. As illustrated in (d) of FIG. 1, the slice data SDATA includes Coding Tree Units (CTUs). A CTU is a block of a fixed size (for example, 64×64) constituting a slice, and may be called a Largest Coding Unit (LCU).

Coding Tree Unit

As illustrated in (c) of FIG. 1, a set of data referred to by the image decoding apparatus 31 to decode a coding tree unit to be processed is defined. The coding tree unit is split by recursive quad tree splits. Nodes of a tree structure obtained by recursive quad tree splits are referred to as Coding Nodes (CNs). Intermediate nodes of a quad tree are coding nodes, and the coding tree unit itself is also defined as a highest coding node. The CTU includes a split flag (cu_split_flag), and in a case that cu_split_flag is 1, the CTU is split into four coding node CNs. In a case that cu_split_flag is 0, the coding node CN is not split, and has one Coding Unit (CU) as a node. The coding unit CU is an end node of the coding nodes and is not split any further. The coding unit CU is a basic unit of coding processing.

In addition, in a case that a size of the coding tree unit CTU is 64×64 pixels, a size of the coding unit may be any of 64×64 pixels, 32×32 pixels, 16×16 pixels, and 8×8 pixels.

Coding Unit

As illustrated in (f) of FIG. 1, a set of data referred to by the image decoding apparatus 31 to decode the coding unit to be processed is defined. Specifically, the coding unit includes a prediction tree, a transform tree, and a CU header CUH. In the CU header, a prediction mode, a split method (PU split mode), and the like are defined.

In the prediction tree, prediction information (a reference picture index, a motion vector, and the like) of each prediction unit (PU) obtained by splitting the coding unit into one or more is defined. In another expression, the prediction unit is one or multiple non-overlapping regions constituting the coding unit. In addition, the prediction tree includes one or multiple prediction units obtained by the above-mentioned split. Note that, in the following, a unit of prediction in which the prediction unit is further split is referred to as a "subblock." The subblock includes multiple pixels. In a case that sizes of a prediction unit and a subblock are the same, there is one subblock in the prediction unit. In a case that the prediction unit has a larger size than the subblock, the prediction unit is split into subblocks. For example, in a case that the prediction unit has a size of 8×8, and the subblock has a size of 4×4, the prediction unit is split into four subblocks which include two horizontal splits and two vertical splits.

Prediction processing may be performed for each of such prediction units (subblocks).

Generally speaking, there are two types of splits in the prediction tree, including a case of an intra prediction and a case of an inter prediction. The intra prediction refers to a prediction in an identical picture, and the inter prediction refers to prediction processing performed between different pictures (for example, between pictures of different display times, and between pictures of different layer images).

In a case of the intra prediction, a split method has sizes of 2N×2N (the same size as that of the coding unit) and N×N.

In addition, in a case of the inter prediction, the split method includes coding in a PU split mode (part_mode) of coded data, and has sizes of 2N×2N (the same size as that of the coding unit), 2N×N, 2N×nU, 2N×nD, N×2N, nL×2N, nR×2N and N×N, and the like. Note that 2N×N and N×2N indicate a symmetric split of 1:1, and 2N×nU, 2N×nD and nL×2N, nR×2N indicate an asymmetric split of 1:3 and 3:1. The PUs included in the CU are expressed as PU0, PU1, PU2, and PU3 sequentially.

In addition, in the transform tree, the coding unit is split into one or multiple transform units, and a position and a size of each transform unit are defined. In another expression, the transform unit is one or multiple non-overlapping regions constituting the coding unit. In addition, the transform tree includes one or multiple transform units obtained by the above-mentioned split.

Splits in the transform tree include those to allocate a region in the same size as that of the coding unit as a transform unit, and those by recursive quad tree splits similarly to the above-mentioned split of CUs.

Transform processing is performed for each of these transform units.

Reference Picture List

A reference picture list is a list including reference pictures stored in a reference picture memory 306.

Configuration of Image Decoding Apparatus

Figure 3:
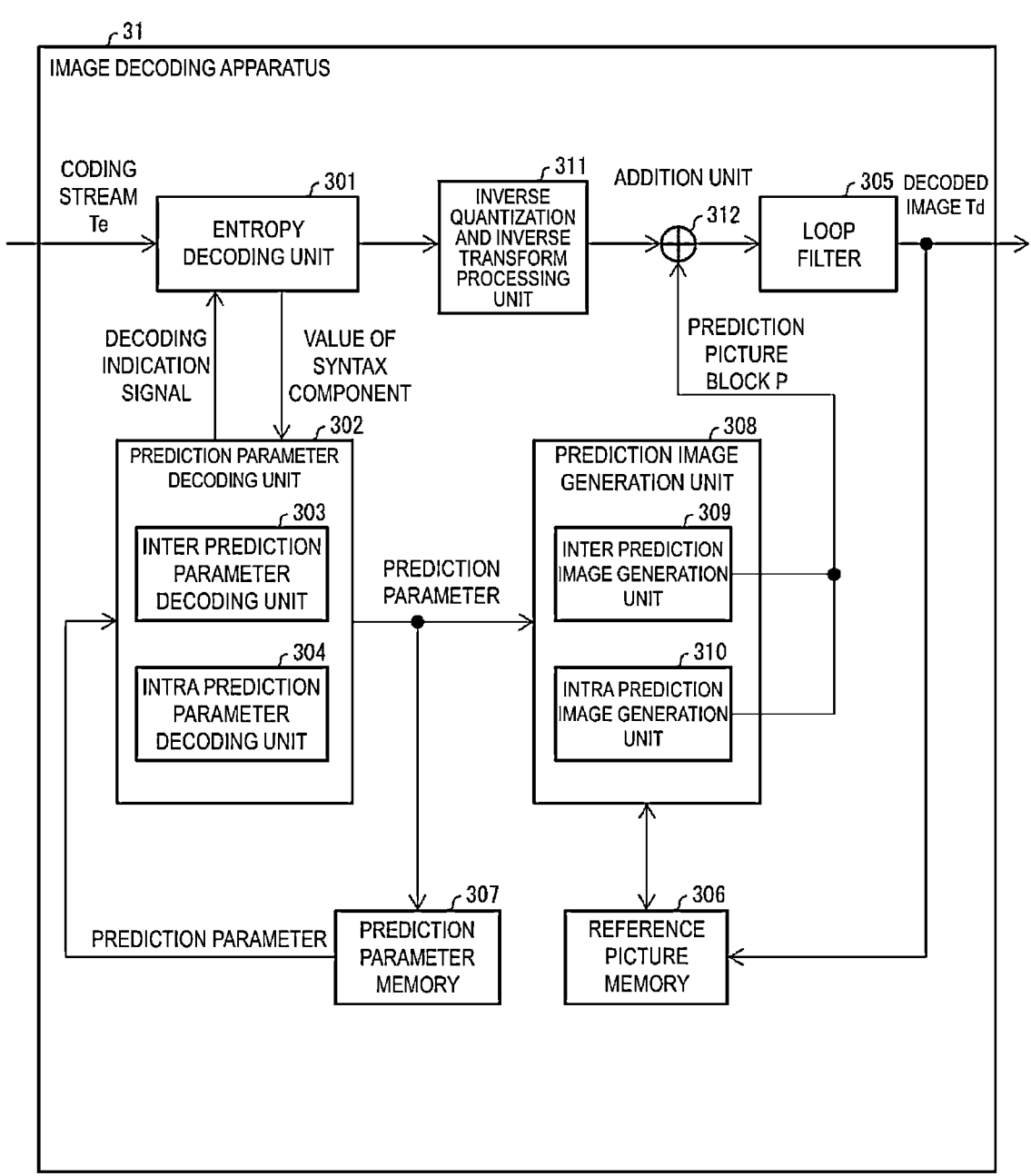
FIG. 3 is a schematic diagram illustrating a configuration of an image decoding apparatus according to the present embodiment.

Next, a configuration of the image decoding apparatus 31 according to the present embodiment will be described. FIG. 3 is a schematic diagram illustrating a configuration of the image decoding apparatus 31 according to the present embodiment. The image decoding apparatus 31 includes an entropy decoding unit 301, a prediction parameter decoding unit (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312.

In addition, the prediction parameter decoding unit 302 includes an inter prediction parameter decoding unit 303 and an intra prediction parameter decoding unit 304. The prediction image generation unit 308 includes an inter prediction image generation unit 309 and an intra prediction image generation unit 310.

The entropy decoding unit 301 performs entropy decoding on the coding stream Te input from the outside and separates and decodes individual codes (syntax components). The separated codes include prediction information to generate a prediction image and residual information to generate a difference image and the like.

The entropy decoding unit 301 outputs a part of the separated codes to the prediction parameter decoding unit 302. For example, a part of the separated codes includes a prediction mode predMode, a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX. Which code is to be decoded is controlled based on an indication of the prediction parameter decoding unit 302. The entropy decoding unit 301 outputs quantization coefficients to the inverse quantization and inverse transform processing unit 311. These quantization coefficients are coefficients obtained by performing a frequency transform such as a Discrete Cosine Transform (DCT), a Discrete Sine Transform (DST), or a Karyhnen Loeve Transform (KLT) on residual signals to quantize the signals in coding processing.

The inter prediction parameter decoding unit 303 decodes an inter prediction parameter with reference to a prediction parameter stored in the prediction parameter memory 307, based on a code input from the entropy decoding unit 301.

The inter prediction parameter decoding unit 303 outputs a decoded inter prediction parameter to the prediction image generation unit 308, and also stores the decoded inter prediction parameter in the prediction parameter memory 307.

The intra prediction parameter decoding unit 304 decodes an intra prediction parameter with reference to a prediction parameter stored in the prediction parameter memory 307, based on a code input from the entropy decoding unit 301. The intra prediction parameter is a parameter used in processing to predict a CU in one picture, for example, an intra prediction mode IntraPredMode. The intra prediction parameter decoding unit 304 outputs a decoded intra prediction parameter to the prediction image generation unit 308, and also stores the decoded intra prediction parameter in the prediction parameter memory 307.

The intra prediction parameter decoding unit 304 may derive different intra prediction modes depending on luminance and chrominance. In this case, the intra prediction parameter decoding unit 304 decodes a luminance prediction mode IntraPredModeY as a prediction parameter of luminance and decodes a chrominance prediction mode IntraPredModeC as a prediction parameter of chrominance. The luminance prediction mode IntraPredMode Y includes 35 modes, and corresponds to a planar prediction (0), a DC prediction (1), and directional predictions (2 to 34). The chrominance prediction mode IntraPredModeC uses any of the planar prediction (0), the DC prediction (1), the directional predictions (2 to 34), and an LM mode (35). The intra prediction parameter decoding unit 304 may decode a flag indicating whether IntraPredModeC is the same mode as the luminance mode, assign IntraPredMode Y to IntraPredModeC in a case of that the flag indicates the same mode as the luminance mode, and decode the planar prediction (0), the DC prediction (1), the directional predictions (2 to 34), and the LM mode (35) as IntraPredModeC in a case of that the flag indicates a different mode from the luminance mode.

The loop filter 305 applies filters such as a deblocking filter, Sample Adaptive Offset (SAO), and an adaptive loop filter (ALF) to the decoded image of the CU generated by the addition unit 312.

The reference picture memory 306 stores a decoded image of the CU generated by the addition unit 312 in a predetermined position for each picture and CU to be decoded.

The prediction parameter memory 307 stores a prediction parameter in a predetermined position for each picture and prediction unit (or a subblock, a fixed size block, and a pixel) to be decoded. Specifically, the prediction parameter memory 307 stores an inter prediction parameter decoded by the inter prediction parameter decoding unit 303, an intra prediction parameter decoded by the intra prediction parameter decoding unit 304 and a prediction mode predMode separated by the entropy decoding unit 301. For example, stored inter prediction parameters include a prediction list use flag predFlagLX (inter prediction indicator inter_pred_idc), a reference picture index refIdxLX, and a motion vector mvLX.

The prediction image generation unit 308 receives input of a prediction mode predMode from the entropy decoding unit 301 and a prediction parameter from the prediction parameter decoding unit 302. In addition, the prediction image generation unit 308 reads a reference picture from the reference picture memory 306. The prediction image generation unit 308 generates a prediction image of a PU or a subblock by using the input prediction parameter and the read reference picture (reference picture block) in the prediction mode indicated by the prediction mode predMode.

Here, in a case that the prediction mode predMode indicates an inter prediction mode, the inter prediction image generation unit 309 generates a prediction image of a PU or a subblock using an inter prediction by using the inter prediction parameter input from the inter prediction parameter decoding unit 303 and the read reference picture (reference picture block).

For a reference picture list (an L0 list or an L1 list) in which the prediction list use flag predFlagLX is 1, the inter prediction image generation unit 309 reads, from the reference picture memory 306, a reference picture block at a position indicated by a motion vector mvLX with reference to the PU to be decoded in the reference picture indicated by the reference picture index refIdxLX. The inter prediction image generation unit 309 performs a prediction based on a read reference picture block and generates a prediction image of the PU. The inter prediction image generation unit 309 outputs the generated prediction image of the PU to the addition unit 312. Here, the reference picture block refers to a set of pixels (referred to as a block because they are normally rectangular) on a reference picture and is a region that is referred to generate a prediction image of a PU or a subblock.

In a case that the prediction mode predMode indicates an intra prediction mode, the intra prediction image generation unit 310 performs an intra prediction by using an intra prediction parameter input from the intra prediction parameter decoding unit 304 and a read reference picture. Specifically, the intra prediction image generation unit 310 reads, from the reference picture memory 306, a PU, which is a picture to be decoded, and a PU neighboring a PU to be decoded in a predetermined range among PUs that have already been decoded. The predetermined range is, for example, any of neighboring PUs on left, top left, top, and top right sides in a case that a PU to be decoded sequentially moves in an order of a so-called raster scan and varies according to intra prediction modes. The order of the raster scan is an order of sequential movement from the left edge to the right edge in each picture for each row from the top edge to the bottom edge.

The intra prediction image generation unit 310 performs a prediction in a prediction mode indicated by the intra prediction mode IntraPredMode based on a read neighboring PU and generates a prediction image of a PU. The intra prediction image generation unit 310 outputs the generated prediction image of the PU to the addition unit 312.

In a case that the intra prediction parameter decoding unit 304 derives different intra prediction modes depending on luminance and chrominance, the intra prediction image generation unit 310 generates a prediction image of a PU of luminance by any of a planar prediction (0), a DC prediction (1), and directional predictions (2 to 34) in accordance with a luminance prediction mode IntraPredMode Y, and generates a prediction image of a PU of chrominance by any of a planar prediction (0), a DC prediction (1), directional predictions (2 to 34), and an LM mode (35) in accordance with a chrominance prediction mode IntraPredModeC.

The inverse quantization and inverse transform processing unit 311 performs inverse quantization on a quantization coefficient input from the entropy decoding unit 301 to calculate a transform coefficient. The inverse quantization and inverse transform processing unit 311 performs an inverse frequency transform such as an inverse DCT, an inverse DST, or an inverse KLT on the calculated transform coefficient to calculate a residual signal. The inverse quantization and inverse transform processing unit 311 outputs the calculated residual signal to the addition unit 312.

The addition unit 312 adds the prediction image of the PU input from the inter prediction image generation unit 309 or the intra prediction image generation unit 310 to the residual signal input from the inverse quantization and inverse transform processing unit 311 for each pixel and generates a decoded image of the PU. The addition unit 312 stores the generated decoded image of a PU in the reference picture memory 306, and outputs a decoded image Td where the generated decoded image of the PU is integrated for each picture to the outside.

Configuration of Image Coding Apparatus

Figure 2:
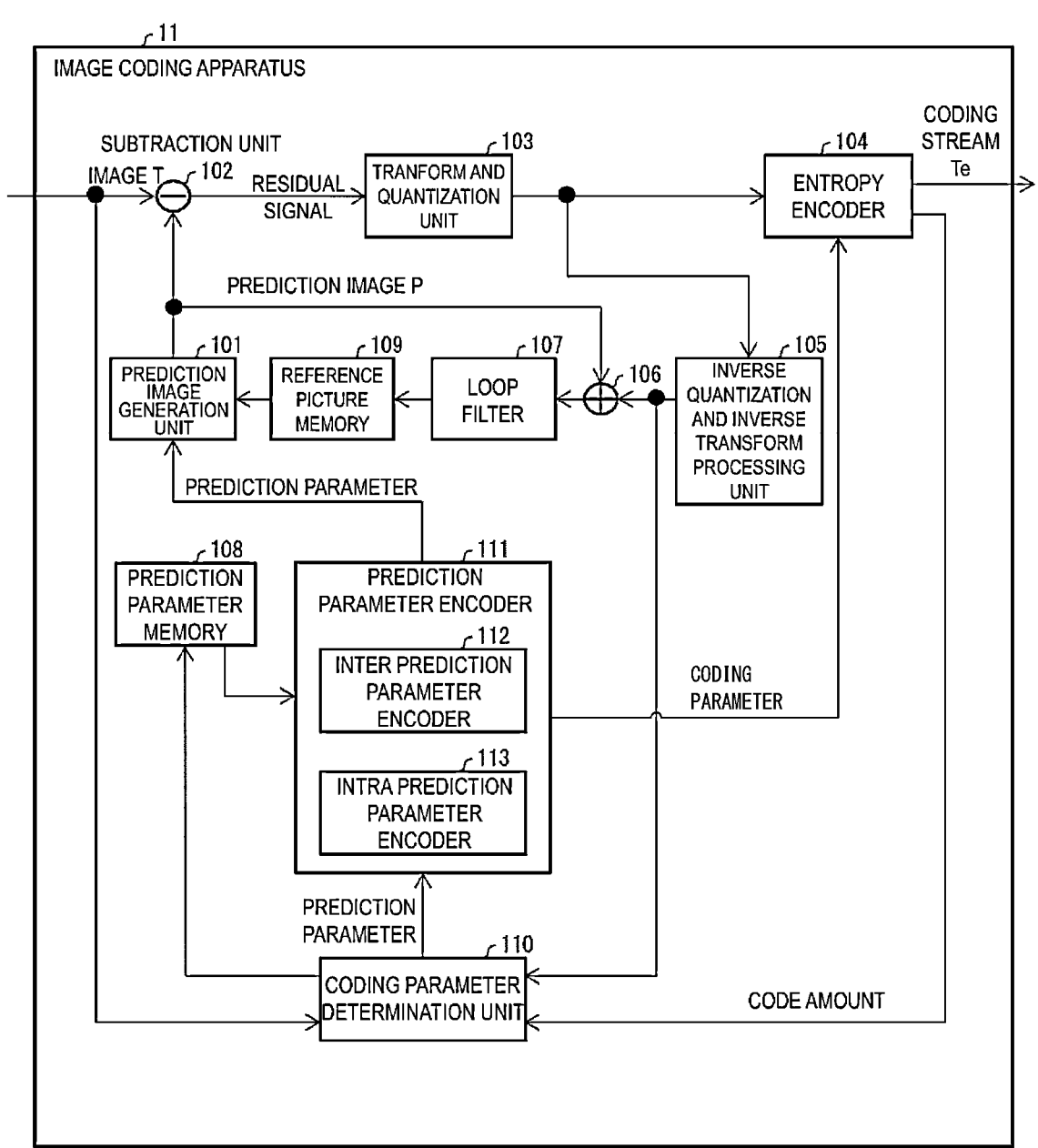
FIG. 2 is a block diagram illustrating a configuration of an image coding apparatus according to the present embodiment.

Next, a configuration of the image coding apparatus 11 according to the present embodiment will be described. FIG. 2 is a block diagram illustrating a configuration of the image coding apparatus 11 according to the present embodiment. The image coding apparatus 11 includes a prediction image generation unit 101, a subtraction unit 102, a transform and quantization unit 103, an entropy encoder 104, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, and a prediction parameter encoder 111. The prediction parameter encoder 111 includes an inter prediction parameter encoder 112 and an intra prediction parameter encoder 113.

For each picture of an image T, the prediction image generation unit 101 generates a prediction image P of a prediction unit PU for each coding unit CU that is a region obtained by splitting the picture. Here, the prediction image generation unit 101 reads a block that has been decoded from the reference picture memory 109 based on a prediction parameter input from the prediction parameter encoder 111. For example, in a case of an inter prediction, the prediction parameter input from the prediction parameter encoder 111 is a motion vector. The prediction image generation unit 101 reads a block at a position in a reference image indicated by the motion vector starting from a target PU. In addition, in a case of an intra prediction, the prediction parameter is, for example, an intra prediction mode. A pixel value of a neighboring PU used in the intra prediction mode is read from the reference picture memory 109, and the prediction image P of the PU is generated. The prediction image generation unit 101 generates the prediction image P of the PU by using one prediction scheme among multiple prediction schemes for a read reference picture block. The prediction image generation unit 101 outputs the generated prediction image P of the PU to the subtraction unit 102.

Note that the operation of the prediction image generation unit 101 is the same as that of the prediction image generation unit 308 already described.

The prediction image generation unit 101 generates a prediction image P of a PU based on a pixel value of a reference block read from the reference picture memory, using a parameter input by the prediction parameter encoder. The prediction image generated by the prediction image generation unit 101 is output to the subtraction unit 102 and the addition unit 106.

The subtraction unit 102 subtracts a signal value of the prediction image P of the PU input from the prediction image generation unit 101 from a pixel value of a corresponding PU of the image T to generate a residual signal. The subtraction unit 102 outputs the generated residual signal to the transform and quantization unit 103.

The transform and quantization unit 103 performs a frequency transform on the residual signal input from the subtraction unit 102 to calculate a transform coefficient. The transform and quantization unit 103 quantizes the calculated transform coefficient to obtain a quantization coefficient. The transform and quantization unit 103 outputs the obtained quantization coefficient to the entropy encoder 104 and the inverse quantization and inverse transform processing unit 105.

To the entropy encoder 104, the quantization coefficient is input from the transform and quantization unit 103, and coding parameters are input from the prediction parameter encoder 111. For example, input coding parameters include codes such as a reference picture index refIdxLX, a prediction vector index mvp_LX_idx, a difference vector mvdLX, a prediction mode predMode, and a merge index merge_idx.

The entropy encoder 104 performs entropy coding on the input quantization coefficients and coding parameters to generate the coding stream Te, and outputs the generated coding stream Te to the outside.

The inverse quantization and inverse transform processing unit 105 performs inverse quantization on the quantization coefficient input from the transform and quantization unit 103 to obtain a transform coefficient. The inverse quantization and inverse transform processing unit 105 performs an inverse frequency transform on the obtained transform coefficient to calculate a residual signal. The inverse quantization and inverse transform processing unit 105 outputs the calculated residual signal to the addition unit 106.

The addition unit 106 adds a signal value of the prediction image P of the PU input from the prediction image generation unit 101 to a signal value of the residual signal input from the inverse quantization and inverse transform processing unit 105 for each pixel and generates a decoded image. The addition unit 106 stores the generated decoded image in the reference picture memory 109.

The loop filter 107 applies a deblocking filter, Sample Adaptive Offset (SAO), and an Adaptive Loop Filter (ALF) to the decoded image generated by the addition unit 106.

The prediction parameter memory 108 stores the prediction parameters generated by the coding parameter determination unit 110 for each picture and CU to be coded at a predetermined position.

The reference picture memory 109 stores the decoded image generated by the loop filter 107 for each picture and CU to be coded at a predetermined position.

The coding parameter determination unit 110 selects one set among multiple sets of coding parameters. A coding parameter refers to the above-mentioned prediction parameter or a parameter to be coded, the parameter being generated in association with the prediction parameter. The prediction image generation unit 101 generates the prediction image P of the PU by using each of the sets of the coding parameters.

The coding parameter determination unit 110 calculates, for each of the multiple sets, a cost value indicating the magnitude of an amount of information and a coding error. A cost value is, for example, the sum of a code amount and the value obtained by multiplying a coefficient 2 by a square error. The code amount is an amount of information of the coding stream Te obtained by performing entropy coding on a quantization error and a coding parameter. The square error is the sum of pixels for square values of residual values of residual signals calculated in the subtraction unit 102. The coefficient A is a real number greater than a preconfigured zero. The coding parameter determination unit 110 selects a set of coding parameters of which cost value calculated is a minimum value. With this configuration, the entropy encoder 104 outputs the selected set of coding parameters as the coding stream Te to the outside and does not output an unselected set of coding parameters. The coding parameter determination unit 110 stores the determined coding parameters in the prediction parameter memory 108.

The prediction parameter encoder 111 derives a format for coding from parameters input from the coding parameter determination unit 110 and outputs the format to the entropy encoder 104. The derivation of the format for coding is, for example, to derive a difference vector from a motion vector and a prediction vector. The prediction parameter encoder 111 derives parameters necessary to generate a prediction image from parameters input from the coding parameter determination unit 110 and outputs the parameters to the prediction image generation unit 101. A parameter necessary to generate a prediction image is, for example, a motion vector of a subblock unit.

The inter prediction parameter encoder 112 derives inter prediction parameters such as a difference vector based on the prediction parameters input from the coding parameter determination unit 110. The inter prediction parameter encoder 112 includes a partly identical configuration to a configuration in which the inter prediction parameter decoding unit 303 (see FIG. 3 and the like) derives inter prediction parameters, as a configuration for deriving parameters necessary for generation of a prediction image output to the prediction image generation unit 101.

The intra prediction parameter encoder 113 derives a format for coding (for example, MPM_idx, rem_intra_luma_pred_mode, or the like) from the intra prediction mode IntraPredMode input from the coding parameter determination unit 110.

Note that, some of the image coding apparatus 11 and the image decoding apparatus 31 in the above-described embodiments, for example, the entropy decoding unit 301, the prediction parameter decoding unit 302, the loop filter 305, the prediction image generation unit 308, the inverse quantization and inverse transform processing unit 311, the addition unit 312, the prediction image generation unit 101, the subtraction unit 102, the transform and quantization unit 103, the entropy encoder 104, the inverse quantization and inverse transform processing unit 105, the loop filter 107, the coding parameter determination unit 110, and the prediction parameter encoder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the image coding apparatus 11 or the image decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Part or all of the image coding apparatus 11 and the image decoding apparatus 31 in the embodiments described above may be realized as an integrated circuit such as a Large Scale Integration (LSI). Each function block of the image coding apparatus 11 and the image decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used. The embodiment of the present disclosure has been described in detail above referring to the drawings, but the specific configuration is not limited to the above embodiments and various amendments can be made to a design that fall within the scope that does not depart from the gist of the present disclosure.

WPP

Figure 4:
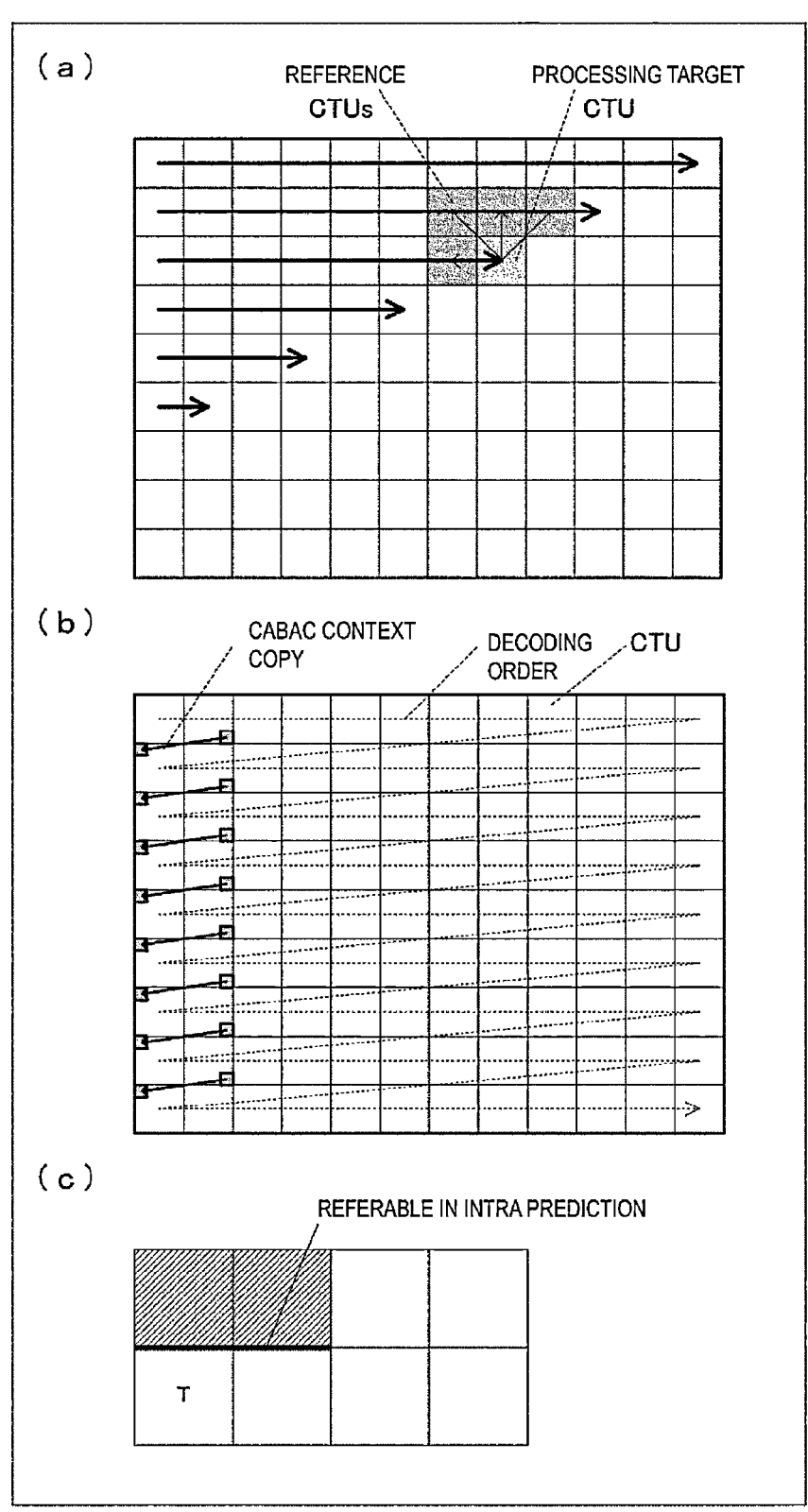
FIGS. 4 (a) to (c) are diagrams for describing an overview of WPP.

The image decoding apparatus 31 and the image coding apparatus 11 according to the present embodiment perform decoding processing and coding processing based on Wavefront Parallel Processing (WPP). First, with reference to FIG. 4, an overview of WPP will be described. (a) to (c) of FIG. 4 are diagrams for describing an overview of WPP. WPP is a technique for performing parallel processing for each CTU row, whereby coding and decoding processing of each CTU row is performed sequentially with the coding and decoding processing being delayed by a time period corresponding to several CTUs. In this manner, in the coding and decoding processing in a target CTU, probability of occurrence of CABAC in a CTU row that is immediately above a CTU row including the target CTU can be used. Further, images and prediction parameters in the CTU row immediately above the CTU row including the target CTU can be referred to. For this reason, performance of entropy coding, intra prediction, and inter prediction is higher than that of slices or the like. In the following, the image decoding apparatus 31 and the image coding apparatus 11 decode or code a flag entropy_coding_sync_enabled_flag indicating whether or not WPP is to be performed.

As illustrated in (a) of FIG. 4, in WPP, for each CTU row, processing can be performed with the processing being delayed by, for example, a time period corresponding to two CTUs (M=1). Further, in the processing of the target CTU, for example, information of CTUs on the upper right side, upper side, upper left side, and left side of the target CTU can be used.

Further, for the sake of independency of CABAC coding (decoding) of each CTU row, CABAC is initialized (reset) at the start of the CTU row. In WPP, as illustrated in (b) of FIG. 4, in a case that entropy_coding_sync_enabled_flag is 1, at the start of each CTU row, a context after processing of the (M+1)-th (for example, the second) CTU from the left of the immediately above CTU row is copied to initialize a CABAC state. Here, the CTU located at the leftmost is referred to as the first CTU.

Further, in a case that intra prediction and inter prediction are performed, a CTU row on the CTU row including the target CTU can be used as a reference region. In WPP, as illustrated in (c) of FIG. 4, also as the reference region in a case that intra prediction is performed, the CTUs up to the position that is a position one CTU forward relative to the target CTU in the CTU row immediately above the CTU row including the target CTU can be used. Regarding a referable range, the same also holds true for the inter prediction in addition to the intra prediction.

Problems of WPP

Figure 5:
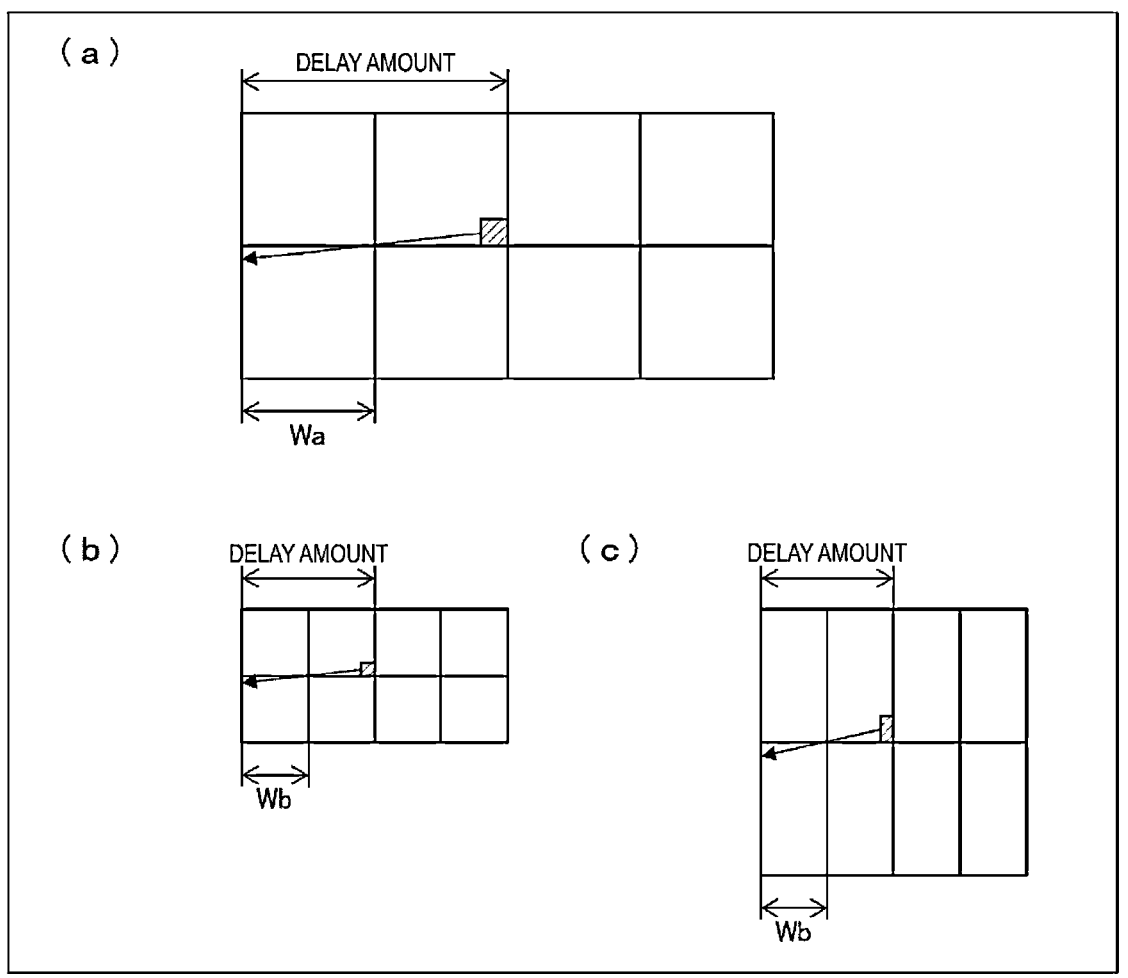
FIGS. 5 (a) to (c) are diagrams for describing problems of WPP.

Next, with reference to FIG. 5, problems of WPP of HEVC will be described. (a) to (c) of FIG. 5 are diagrams for describing problems of WPP. In WPP of HEVC, the coding and decoding processing of each CTU row is performed sequentially with the coding and decoding processing being delayed by two CTUs. There is a problem that the delay amount is fixed to two CTUs and is also large. Further, in a case that a CTU width is doubled, the delay amount is doubled. For example, in a case that a width Wa of the CTU illustrated in (a) of FIG. 5 is twice as large as a width Wb of the CTU illustrated in (b) of FIG. 5, the delay amount of each single CTU row in the example illustrated in (a) of FIG. 5 is twice as large as the delay amount of the example illustrated in (b) of FIG. 5. Thus, there is a problem that the delay amount is further increased as the width of the CTU is further increased. Note that, even in a case that heights are different ((b) and (c) of FIG. 5), the delay amount is the same on the condition that the widths of the CTUs are the same. WPP of HEVC has the following problems, including the problems described above.

(Problem 1) There is a problem that a delay amount M is 1 (corresponding to two CTUs) and is large in a fixed manner (particularly in a case that the CTU size is large).

(Problem 2) There is a problem that the delay amount M may be increased depending on the width of the CTU.

(Problem 3) Because the delay amount M is fixed, parallelism cannot be improved by reducing the delay amount. Further, performance of entropy coding, intra prediction, and inter prediction cannot be improved by increasing the delay amount M.

(Problem 4) In HEVC, the delay amount (range) of prediction is determined in a range of the delay amount of CABAC. Specifically, there is a problem that reference possibility determining the delay amount of prediction is not dependent on presence or absence of operation of WPP (entropy_coding_sync_enabled_flag). For this reason, there is a problem that, in a case that WPP is "ON" in processing in which pixels or prediction parameters of an above CTU row, for example, are referred to in the intra prediction or the inter prediction, actual reference cannot be performed.

(Problem 5) Only the delay amount of CABAC is defined in a fixed manner, and the delay amount of prediction is not defined. Specifically, there is a problem that the delay amount of CABAC and the delay amount of prediction cannot be set to different values. For this reason, for example, in the image decoding apparatus in which CABAC processing is performed prior to prediction processing, a configuration in which the CABAC processing is started and then the prediction processing is performed later (configuration in which the delay amount of CABAC is reduced less than the delay amount of prediction) cannot be implemented. In the image coding apparatus in which the prediction processing is performed prior to the CABAC processing, a configuration in which the prediction processing is started and then the CABAC processing is performed later (configuration in which the delay amount of CABAC is reduced to less than the delay amount of prediction) cannot be implemented. In the following description, in a case that the delay amount M of prediction and the delay amount M of CABAC are distinguished, the delay amount of prediction is represented by Mp and the delay amount of CABAC is represented by Mc.

Basic Configuration

As described above, in WPP of HEVC, decoding is performed by using information of CTUs up to the position that is a position one CTU forward relative to the target CTU in the CTU row immediately above the target CTU. Moreover, the processing has the problems described above.

In view of this, the prediction image generation unit 308 and the entropy decoding unit 301 according to the present embodiment perform generation of a prediction image, derivation of a prediction parameter, or entropy decoding through the following processing, in a case that parallel processing is performed with time being shifted in each CTU row as in WPP. Note that an entity that performs the generation of a prediction image is the prediction image generation unit 308, an entity that performs the derivation of a prediction parameter is the inter prediction parameter decoding unit 303 and the intra prediction parameter decoding unit 304, and an entity that performs the entropy decoding is the entropy decoding unit 301.

Reduction of Delay Amount of Intra Prediction and Inter Prediction

In a case that the prediction image generation unit 308 generates a prediction image by use of the intra prediction, the prediction image generation unit 308 may generate the prediction image by performing the intra prediction by using only pixel values up to the CTU that is located at the same position as the target CTU in the CTU row immediately above the CTU (target CTU) including the target block. In this case, the intra prediction can be started earlier than that in a case that pixel values up to the CTU at a position one CTU forward relative to (one CTU ahead of) the target CTU in the CTU row immediately above the target CTU are used. This is because there is no need to wait for completion of the decoding processing of the CTU at a position one CTU forward relative to the CTU located at the same position as the target CTU in the CTU row immediately above the target CTU.

In a similar manner to the prediction image generation unit 308, in a case that the inter prediction parameter decoding unit 303 and the intra prediction parameter decoding unit 304 derive the prediction parameter by use of the inter prediction and the intra prediction, the inter prediction parameter decoding unit 303 and the intra prediction parameter decoding unit 304 may derive the prediction parameter of the target block by using the prediction parameters up to the position of the CTU located at the same position as the target CTU in the CTU row immediately above the target CTU. For example, in reference of motion information of an upper left block, an upper block, and an upper right block in derivation of spatial merge candidates and in reference of an intra prediction mode of an upper left block, an upper block, and an upper right block in derivation of an estimation intra prediction mode (MostProbableMode, MPM), derivation may be performed by using only the prediction parameters up to the CTU located at the same position. Specifically, the delay M may be configured to be 1.

Details of Intra Prediction Limitation and Inter Prediction Limitation

More specifically, the prediction image generation unit 308 and the prediction parameter decoding unit 302 may perform the processing described above in the following measures. HEVC defines processing of deriving availableN, which indicates whether or not a neighboring region represented by (xNbY, yNbY) is available in a target region represented by (xCurr, yCurr). Here, (xCurr, yCurr) represents upper left coordinates of the target block in a case that the upper left in the target picture is used as the origin. (xNbY, yNbY) represents upper left coordinates of a neighboring block in a case that the upper left in the target picture is used as the origin. Further, in a case that (xNbY, yNbY) is unavailable, availableN is rendered FALSE. Note that, in HEVC, criterion for judging whether or not (xNbY, yNbY) is available is expressed as follows.

xNbY is less than 0
yNbY is less than 0
xNbY is greater than or equal to pic_width_in_lu-
ma_samples
yNbY is greater than or equal to pic_height_in_lu-
ma_samples Further, in the processing of deriving availableN, the prediction image generation unit 308 and the prediction parameter decoding unit 302 according to the present embodiment perform processing by adding, to the condition of availableN=FALSE, a condition of "in a case that entropy_coding_sync_enabled_flag is 1 and a CTU position of xNbY is at least a processing size wCTU*(Mp+1) ahead from the current CTU position" (wCTU represents a CTU width) with M (in the equations below, Mp, Mp=M) representing the delay amount. Note that entropy_coding_sync_enabled_flag is a flag indicating whether or not WPP is to be performed. Thus, in the present embodiment, in a case that any of the following conditions is satisfied, availableN is rendered FALSE.

xNbY is less than 0
yNbY is less than 0
xNbY is greater than or equal to pic_width_in_lu-
ma_samples
yNbY is greater than or equal to pic_height_in_lu-
ma_samples
entropy_coding_sync_enabled_flag is 1 and CTU addr of xNbY is greater than or equal to CTU addr of xCurr+ wCTU*(Mp+1)

Here, the CTU position using the unit of the CTU width wCTU of a target position (xCurr, yCurr) and a reference position (xNbY, yNbY) can be derived by performing a right shift using ctuSizeBit. Thus, a case that availableN is FALSE may be derived by using the following equation.

$$entropy\_coding\_sync\_enabled\_flag \text{ is } 1 \text{ and}$$
$$(xNbY >> ctu\text{SizeBit}) \text{ is greater than or equal to}$$
$$(xCurr >> ctu\text{SizeBit}) + Mp + 1$$

Here, ctuSizeBit=log 2 (wCTU).

Alternatively, the case may be derived by using the following equation.

$$entropy\_coding\_sync\_enabled\_flag \text{ is } 1 \text{ and}$$
$$(xNbY\% \ wCTU) \text{ is greater than or equal to}$$
$$(xCurr \% \ wCTU) + Mp + 1$$

Note that, as a flag indicating whether or not reference is possible, derivation may be performed as a flag related to WPP instead of performing derivation as one of the flags availableN related to the outside of the picture. In this case, derivation can be performed according to the following.

$$availableN = entropy\_coding\_sync\_enabled\_flag == 0 \text{ or}$$
$$(xNbY >> ctu\text{SizeBit}) \text{ is less than or equal to}$$
$$(xCurr >> ctu\text{SizeBit}) + Mp$$

This also holds true in the following.

$$availableN = entropy\_coding\_sync\_enabled\_flag == 0 \text{ or}$$
$$(xNbY\% \ wCTU) \text{ is less than or equal to } (xCurr$$
$$\% \ wCTU) + Mp$$

Figure 6:
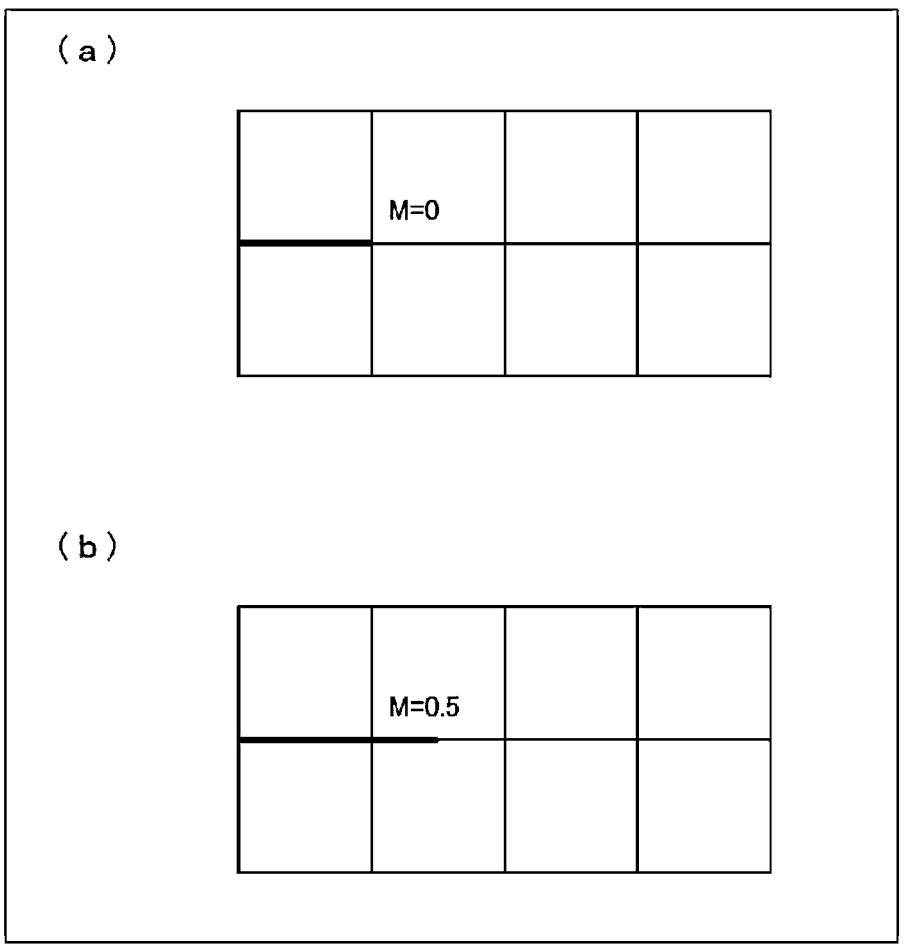
FIGS. 6 (a) and (b) are each a diagram for describing a range available for intra prediction according to the present embodiment.

Further, in the present embodiment, by configuring M (Mp) as appropriate, a referable range of the CTUs can be configured at any position. By setting M to lower than 1, Problem 1 can be solved. For example, in a case that M=0, as illustrated in (a) of FIG. 6, a reference CTU that can be used for the intra prediction and the inter prediction is a CTU located at the same position in the CTU row immediately above the target CTU. Further, in a case that M=0.5, as illustrated in (b) of FIG. 6, the reference CTU that can be used for the intra prediction is a region at a position 0.5 CTU forward relative to the CTU located at the same position in the CTU row immediately above the target CTU. Note that, in a case that the reference region is located inside the CTU, this case can be handled by changing block scanning order in the CTU. Processing of changing the block scanning order will be described later.

Note that coordinates (xCTU, yCTU) of the target CTU being a CTU including the position (xCurr, yCurr) may be derived as below.

$$xCTU = xCurr/wCTU * wCTU = (xCurr >> ctuSizeBit) << ctuSizeBit$$

$$yCTU = yCurr/hCTU * hCTU = (xCurr >> \log2(hCTU)) << \log2(hCTU)$$

In this case, in the target CTU (xCTU, yCTU), the prediction image generation unit 308 according to the present embodiment may use images up to xCTU+wCTU*(Mp+1)−1 in the immediately above CTU row for the intra prediction. Further, the inter prediction parameter decoding unit 303 and the intra prediction parameter decoding unit 304 may also use the prediction parameters of prediction blocks up to xCTU+wCTU*(Mp+1)−1 for derivation of the prediction parameter of the target block.

In this manner, by deriving the reference possibility availableN of pixels and prediction parameters of the intra prediction and the inter prediction depending on entropy_coding_sync_enabled_flag and the target position (xCurr, yCurr) and the reference position (xNb, yNb), operation can be guaranteed even in a case that a reference range of the pixels and the prediction parameters of the intra prediction and the inter prediction is increased. This brings an effect of solving Problem 4.

Reduction of Delay Amount of Entropy Decoding Unit

In CABAC decoding, the entropy decoding unit 301 may perform CABAC initialization of the target CTU by using a CABAC state at a time point that decoding processing of the CTU located at the same position in the CTU row immediately above the target CTU is completed. In this manner, the CABAC processing can be started earlier than that in a case that a CABAC state at a time point that decoding processing of the CTU at a position one CTU forward relative to the CTU located at the same position as the target CTU in the CTU row immediately above the target CTU is completed is used. This is because there is no need to wait for completion of the decoding processing of the CTU at a position one CTU forward relative to the CTU located at the same position as the target CTU in the CTU row immediately above the target CTU.

More specifically, the entropy decoding unit 301 performs the processing described above in the following measures. In HEVC, in a case that entropy_coding_sync_enabled_flag indicating whether or not WPP is to be performed is 1, the entropy decoding unit 301 stores a CABAC state of a second CTU (CtbAddrInRs % PicWidthInCtbsY is equal to 1) in the CTU row in a storage (memory) and initializes a first CTU (CtbAddrInRs % Pic WidthInCtbsY is equal to 0) in the next CTU row using the CABAC state stored in the storage. Here, CtbAddrInRs represents a CTU address of a case that the CTUs are scanned in raster scan order in a picture, and PicWidthInCtbsY represents the number of CTUs of the picture in the horizontal direction. A relationship with a block upper left position (xCurr, yCurr) in each picture is as below. Thus, determination may be performed by using a block upper left position in each pixel. The same holds true for the following.

$$(CtbAddrInRs \% PicWidthInCtbsY) =$$

$$(xCurr \% wCTU) = (xCurr \gg ctuSizeBit)$$

Details of Entropy Decoding Unit

In a case that entropy_coding_sync_enabled_flag=1 (WPP "ON"), the entropy decoding unit 301 according to the present embodiment stores a CABAC state of a case of the (Mc+1)-th CTU in the CTU row (CtbAddrInRs % Pic WidthInCtbsY is equal to Mc). Then, initialization is performed by using the CABAC state stored in the storage in a case of the first CTU (CtbAddrInRs % Pic WidthInCtbsY is equal to 0) in the next CTU row.

Further, in the present embodiment, by configuring Mc as appropriate, the position of CABAC initialization can be configured at any position. By setting Mc to less than 1, Problem 1 can be solved.

Figure 7:
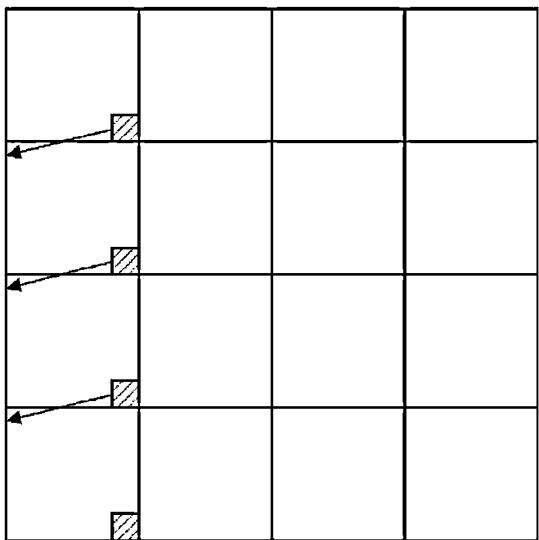
FIG. 7 is a diagram for describing available positions of a CABAC state in processing according to the present embodiment.

For example, in a case that Mc=0, as illustrated in FIG. 7, in the CABAC decoding, CABAC initialization of the target CTU can be performed by using a CABAC state at a time point that decoding processing of the CTU located at the same position in the CTU row immediately above the target CTU is completed. Note that, in a case that a CABAC state at a time point that decoding processing of the CTU at a position one CTU forward relative to the CTU located at the same position as the target CTU in the CTU row immediately above the target CTU is completed is used in accordance with HEVC, it is only necessary that Mc be set to 1.

Note that the prediction image generation unit 101 of the image coding apparatus 11 performs processing similar to that of the prediction image generation unit 308 described above. Further, in initialization of a state of CABAC, the entropy encoder 104 of the image coding apparatus 11 performs processing similar to the initialization of a state of CABAC performed by the entropy decoding unit 301 described above.

As described above, the image decoding apparatus 31 according to the present embodiment is an image decoding apparatus 31 for dividing a picture into multiple CTU rows and decoding each of the multiple CTU rows sequentially from top. The image decoding apparatus 31 includes: the prediction image generation unit 308 that generates, in a case of generating a prediction image by use of the intra prediction, the prediction image to be used for decoding of a target CTU by using decoded data up to the same position as the target CTU in the CTU row (second CTU row) immediately above the CTU row (first CTU row) including the target CTU; and the entropy decoding unit 301 that decodes the target CTU by using a state of CABAC at the same position as the target CTU in the second CTU row.

Processing Example 1

Figure 8:
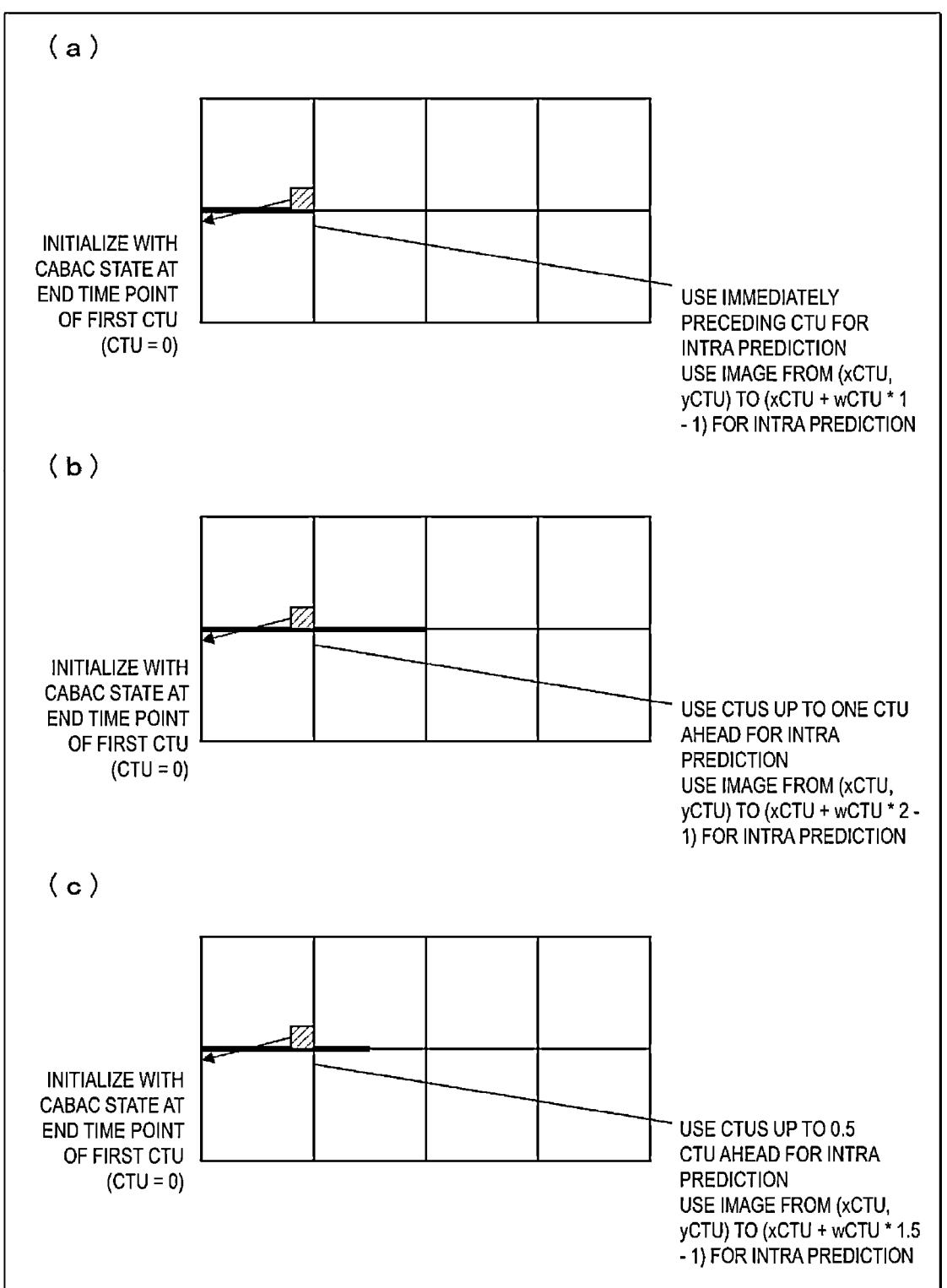
FIGS. 8 (a) to (c) are each a diagram illustrating a processing example according to the present embodiment.

Next, with reference to (a) of FIG. 8, Processing Example 1 will be described. In the present processing example, in the processing in the target CTU, the prediction image generation unit 308 uses CTUs up to the same position in the CTU row immediately above the target CTU as the reference CTU to be referred to in a case of generating a prediction image by use of the intra prediction. Further, the entropy decoding unit 301 performs initialization of a CABAC state of the first CTU in the CTU row by using a CABAC state of the CTU located at the same position in the immediately above CTU row.

Specifically, in Processing Example 1, the prediction image generation unit 308 performs processing in the above-described processing with Mp being 0, and the entropy decoding unit 301 performs processing in the above-described processing with Me being 0.

In other words, in the target CTU (xCTU, yCTU), the prediction image generation unit 308 uses images up to xCTU+wCTU*1−1 in the immediately above CTU row for the intra prediction. In the inter prediction parameter decoding unit 303 and the intra prediction parameter decoding unit 304 as well, blocks up to xCTU+wCTU*1−1 may be referred to. Further, the entropy decoding unit 301 performs CABAC initialization in the CTU row of a processing target by using a CABAC state at a time point that processing in the first CTU in the immediately above CTU row is completed.

As described above, the prediction image generation unit 308 of the image decoding apparatus 31 according to the present processing example generates, in a case of generating a prediction image by use of the intra prediction, the prediction image to be used for decoding of a target CTU by using decoded data up to the same position as the target CTU in the CTU row (second CTU row) immediately above the CTU row (first CTU row) including the target CTU, and the entropy decoding unit 301 decodes the target CTU by using a state of CABAC at the same position as the target CTU in the second CTU row. Note that, in the inter prediction parameter decoding unit 303 and the intra prediction parameter decoding unit 304 as well, prediction parameters may be derived by using the decoded data up to the same position as the target CTU.

Processing Example 2

Next, with reference to (b) of FIG. 8, Processing Example 2 will be described. In the present processing example, in the processing in the target CTU, the prediction image generation unit 308 uses a CTU at a position one CTU forward relative to the CTU located at the same position in the CTU row immediately above the target CTU as the reference CTU to be referred to in a case of generating a prediction image by use of the intra prediction. Further, the entropy decoding unit 301 performs initialization of a CABAC state of the first CTU in the CTU row by using a CABAC state of the CTU located at the same position in the immediately above CTU row.

Specifically, in Processing Example 2, the prediction image generation unit 308 performs processing in the above-described processing with Mp being 1, and the entropy decoding unit 301 performs processing in the above-described processing with Mc being 0.

In other words, in the target CTU (xCTU, yCTU), the prediction image generation unit 308 uses images up to xCTU+wCTU*2−1 in the immediately above CTU row for the intra prediction. In the inter prediction parameter decoding unit 303 and the intra prediction parameter decoding unit 304 as well, blocks up to xCTU+wCTU*2−1 may be referred to. Further, the entropy decoding unit 301 performs CABAC initialization in the CTU row of a processing target by using a CABAC state at a time point that processing in the first CTU in the immediately above CTU row is completed.

As described above, the prediction image generation unit 308 of the image decoding apparatus 31 according to the processing example generates, in a case of generating a prediction image by use of the intra prediction, the prediction image to be used for decoding of a target CTU by using decoded data up to a position one CTU forward relative to the CTU located at the same position as the target CTU in the CTU row (second CTU row) immediately above the CTU row (first CTU row) including the target CTU, and the entropy decoding unit 301 decodes the target CTU by using a state of CABAC at the same position as the target CTU in the second CTU row. Note that, in the inter prediction parameter decoding unit 303 and the intra prediction parameter decoding unit 304 as well, prediction parameters may be derived by using the decoded data up to the position one CTU forward relative to the CTU located at the same position as the target CTU.

In this manner, by configuring the delay amount Mp of CABAC and the delay amount Mc of prediction to different values (Mc<Mp), Problem 5 is solved, and in the image decoding apparatus in which the CABAC processing is performed prior to the prediction processing, the configuration in which the CABAC processing is started and then the prediction processing is performed later (configuration in which the delay amount of CABAC is reduced to less than the delay amount of prediction) can be implemented.

Conversely, the prediction image generation unit 308 may perform processing in the above-described processing with Mp being 0, and the entropy decoding unit 301 may perform processing in the above-described processing with Mc being 1. By configuring the delay amount Mp of CABAC and the delay amount Mc of prediction to different values (Mc>Mp), in the image coding apparatus in which the prediction processing is performed prior to the CABAC processing, a configuration in which the prediction processing is started and then the CABAC processing is performed later (configuration in which the delay amount of CABAC is reduced to less than the delay amount of prediction) can be implemented.

Processing Example 3

Next, with reference to (c) of FIG. 8, Processing Example 3 will be described. In the present processing example, in the processing in the target CTU, the prediction image generation unit 308 uses a region (Mp=0.5) at a position 0.5 CTU forward relative to the CTU located at the same position in the CTU row immediately above the target CTU as the reference CTU to be referred to in a case of generating a prediction image by use of the intra prediction. Further, the entropy decoding unit 301 performs initialization of a CABAC state of the first CTU in the CTU row by using a CABAC state of the CTU located at the same position in the immediately above CTU row (Mc=0).

Specifically, in Processing Example 3, the prediction image generation unit 308 performs processing in the above-described processing with Mp being 0.5, and the entropy decoding unit 301 performs processing in the above-described processing with Mc being 0.

In other words, in the target CTU (xCTU, yCTU), the prediction image generation unit 308 uses images up to xCTU+wCTU*1.5−1 in the immediately above CTU row for the intra prediction. In the inter prediction parameter decoding unit 303 and the intra prediction parameter decoding unit 304 as well, blocks up to xCTU+wCTU*1.5−1 are referred to. Further, the entropy decoding unit 301 performs CABAC initialization in the CTU row of a processing target by using a CABAC state at a time point that processing in the first CTU in the immediately above CTU row is completed.

As described above, the prediction image generation unit 308 of the image decoding apparatus 31 according to the present processing example generates, in a case of generating a prediction image by use of the intra prediction, the prediction image to be used for decoding of a target CTU by using decoded data up to a position 0.5 CTU forward relative to the CTU located at the same position as the target CTU in the CTU row (second CTU row) immediately above the CTU row (first CTU row) including the target CTU, and the entropy decoding unit 301 decodes the target CTU by using a state of CABAC at the same position as the target CTU in the second CTU row. Note that, in the inter prediction parameter decoding unit 303 and the intra prediction parameter decoding unit 304 as well, prediction parameters may be derived by using the decoded data up to the position 0.5 CTU forward relative to the CTU located at the same position as the target CTU.

Further, as illustrated in Processing Examples 1 to 3, in the present embodiment, a region that can be used in a case that the prediction image generation unit 308 generates a prediction image by use of the intra prediction and a region of the CTU that is used by the entropy decoding unit 301 to perform CABAC initialization need not necessarily match each other.

Processing Example 4

Figure 9:
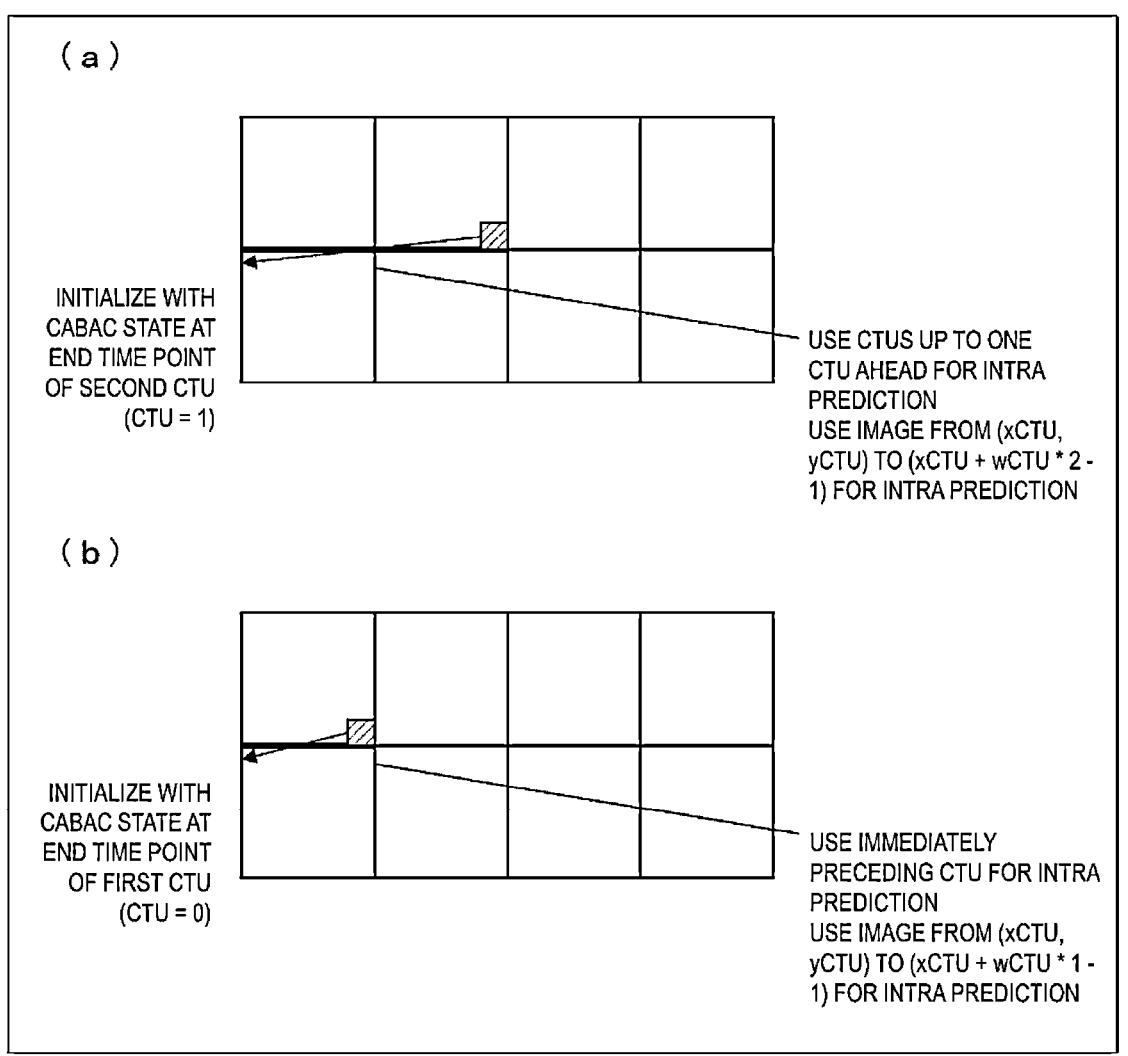
FIGS. 9 (a) and (b) are each a diagram for describing a processing example according to the present embodiment.

In the present processing example, regarding the processing based on WPP described above, the processing ((a) of FIG. 9) using information of the CTUs up to the position one CTU forward relative to the same position as the target CTU in the CTU row immediately above the target CTU or the processing described in Processing Example 1 can be selected. Note that the processing described in Processing Example 1 is processing that uses information of the CTU located at the same position as the target CTU in the CTU row immediately above the target CTU ((b) of FIG. 9).

In the present processing example, in the processing in the target CTU, the image coding apparatus 11 codes information indicating which of the processing that uses information of the CTU up to the position one CTU forward (M=1) relative to the same position as the target CTU in the CTU row immediately above the target CTU and the processing in Processing Example 1 (M=0) is used to perform the processing, in the SPS, the PPS, or the slice header, and transmits the coded information to the image decoding apparatus 31. Further, the image decoding apparatus 31 decodes the information indicating which of the processing using the information of the CTU up to the position one CTU forward relative to the same position as the target CTU in the CTU row immediately above the target CTU and the processing in Processing Example 1 is used to perform the processing, from the received coded data regarding the target CTU. Then, based on the information, the processing using the information of the CTU up to the position one CTU forward relative to the same position as the target CTU in the CTU row immediately above the target CTU is performed, or the processing in Processing Example 1 is performed.

The information may be a flag indicating which processing is used, or may be information indicating an available position, such as values of Mp and Mc described above.

As described above, the image decoding apparatus 31 according to the present processing example is an image decoding apparatus 31 for dividing a picture into multiple CTU rows and decoding each of the multiple CTU rows sequentially from top. The image decoding apparatus 31 includes the entropy decoding unit 301 that decodes information indicating which of the information (state of CABAC) of the CTU up to the position one CTU forward relative to the same position as the target CTU in the CTU row (second CTU row) immediately above the target CTU or the information (state of CABAC) of the CTU located at the same position as the target CTU in the second CTU row is used to perform the decoding processing based on WPP in the first CTU (target CTU) in each CTU row.

Note that the delay amount M (Mp, Mc) is not limited to 0 and 1. For example, the delay amount M may be switched as follows: Mp=Mc=0, 1, 3, 7. In other words, syntax for switching M or syntax representing M may be included in coded data, and the coded data may be coded. In this manner, Problem 3 that parallelism cannot be improved by reducing the delay amount and that coding performance cannot be improved by increasing the delay amount M can be solved.

Second Embodiment

Figure 10:
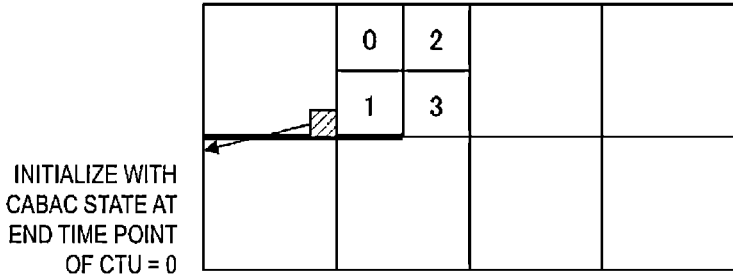
FIG. 10 is a previous diagram for describing scan order in a CTU according to the present embodiment.

In the present embodiment, the prediction image generation unit 308 changes the block scanning order in the CTU in a case that the prediction image generation unit 308 performs WPP. The blocks in the CTU are scanned in the raster scan order in HEVC. In the present embodiment as illustrated in FIG. 10, however, the blocks are scanned in the vertical direction. Specifically, for example, in a case that the CTU is split into four blocks and the raster scan order is used, scanning is performed in the order of upper left, upper right, lower left, and lower right; however, in the present embodiment, scanning is performed in the order of upper left, lower left, upper right, and lower right (in the order starting from 0 to 3 in FIG. 10). In this manner, the order in which blocks that border the next CTU row are scanned (decoding order, coding order) can be started earlier than the raster scan order.

For example, in a case of Processing Example 3 of Embodiment 1 described above, delay of the intra prediction and the inter prediction can be reduced. In Processing Example 3 of Embodiment 1, the reference CTU to be referred to in a case that the prediction image generation unit 308 generates a prediction image by use of the intra prediction and the inter prediction is a region at a position 0.5 CTU forward relative to the CTU located at the same position in the CTU row immediately above the target CTU. This is because, in the present embodiment, making a change in the scan order of blocks can start to process the region earlier as compared to a case of normal raster scan.

In the present embodiment, in a case of WPP (entropy_coding_sync_enabled_flag=1), a flag (alt_cu_scan_order_flag) indicating whether or not the scan order is to be changed is included in coded data, and in a case that the flag is 1, the scan order is changed. FIG. 11 illustrates a syntax example of block split according to HEVC. Further, FIG. 12 illustrates a syntax example of a case that block split is performed according to the present embodiment. As illustrated in FIG. 12, the present embodiment is different from HEVC in that, in a case that alt_cu_scan_order_flag=1, the scan order is changed from the raster scan order to scan order in the vertical direction (SYN1411 of FIG. 12).

Further, FIG. 13 illustrates a syntax example of binary tree split (binary_tree). The binary tree split is the same in the processing according to the present embodiment and the processing according to HEVC.

As described above, the image decoding apparatus 31 according to the present embodiment is an image decoding apparatus 31 for dividing a picture into multiple CTU rows and decoding each of the multiple CTU rows sequentially from top. In the image decoding apparatus 31, in a case that processing based on WPP is performed, order that proceeds in the vertical direction from the upper left to the lower right is used as processing order in the CTU.

Third Embodiment

In the present embodiment, in the processing based on WPP described in Embodiment 1, the entropy decoding unit 301 determines whether the decoding processing is performed by using a state of CABAC of the CTU up to the position one CTU forward relative to the same position as the target CTU in the CTU row immediately above the target CTU (first CTU of each CTU row), or the decoding processing is performed by using a state of CABAC of the CTU located at the same position as the target CTU in the CTU row immediately above the target CTU, based on the width of the CTU. In this manner, Problem 2 can be solved.

As described above, in WPP, delay is further increased as the width of the CTU is further increased. In view of this, in the present embodiment, which position is used for a state of CABAC of the CTU for initialization of the target block is determined depending on whether or not the width of the CTU is larger than a prescribed value (Th).

Figure 14:
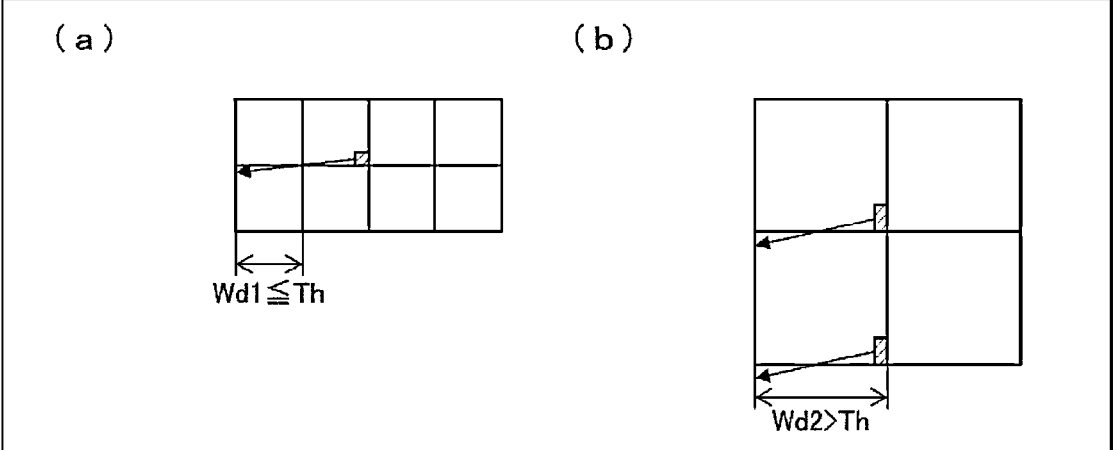
FIGS. 14 (a) and (b) are each a diagram for describing processing of determining a position of a CTU to be referred to, based on the width of the CTU.

Specific description will be given with reference to FIG. 14. (a) of FIG. 14 illustrates a case that a width Wd1 of the CTU is equal to or less than the prescribed width Th, and (b) of FIG. 14 illustrates a case that a width Wd2 of the CTU is larger than the prescribed width Th. As illustrated in (a) of FIG. 14, in a case that the width Wd1 of the CTU is equal to or less than the prescribed width Th (Wd1≤Th), the entropy decoding unit 301 performs the decoding processing by using a state of CABAC of the CTU located at the position one CTU forward relative to the same position as the target CTU in the CTU row immediately above the target CTU (first CTU of the CTU row). Further, as illustrated in (b) of FIG. 14, in a case that the width Wd2 of the CTU is larger than the prescribed width Th (Wd2>Th), the entropy decoding unit 301 performs the decoding processing by using a state of CABAC of the CTU located at the same position as the target CTU in the CTU row immediately above the target CTU (first CTU of the CTU row).

Note that whether the decoding processing is performed by using a state of CABAC of the CTU up to the position one CTU forward relative to the same position as the target CTU in the CTU row immediately above the target CTU (first CTU of the CTU row) or the decoding processing is performed by using a state of CABAC of the CTU located at the same position as the target CTU in the CTU row immediately above the target CTU may be determined based on whether or not the CTU itself is vertically long instead of whether or not the width of the CTU is larger than a prescribed value. This is because, in a case that the CTU is vertically long, it can be inferred that the width is small for the CTU size, and in this case it can be considered that delay is small as compared to other cases.

Figure 15:
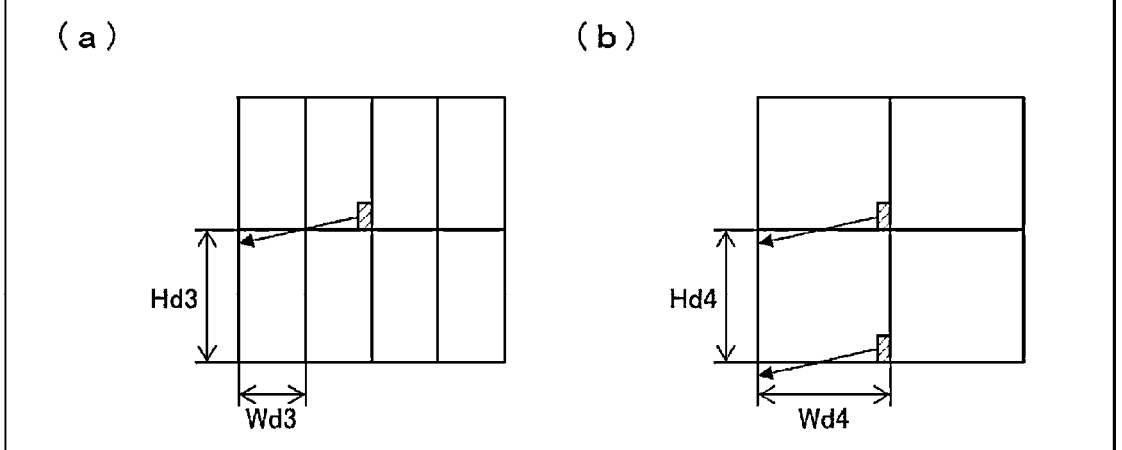
FIGS. 15 (a) and (b) are each a diagram for describing processing of determining a position of a CTU to be referred to, based on whether or not the CTU has a shape vertically long.

Specific description will be given with reference to FIG. 15. (a) of FIG. 15 illustrates a case that the CTU is vertically long, and (b) of FIG. 15 illustrates a case that the CTU is not vertically long. As illustrated in (a) of FIG. 15, in a case that a width Wd3 of the CTU is smaller than a height Hd3 (Wd3<Hd3), the entropy decoding unit 301 performs the decoding processing by using a state of CABAC of the CTU located at the position one CTU forward relative to the same position as the target CTU in the CTU row immediately above the target CTU (first CTU). Further, as illustrated in (b) of FIG. 15, in a case that a width Wd4 of the CTU is equal to or larger than a height Hd4 (Wd4≥Hd4), the entropy decoding unit 301 performs the decoding processing by using a state of CABAC of the CTU located at the same position as the target CTU in the CTU row immediately above the target CTU (first CTU).

As described above, the image decoding apparatus 31 according to the present embodiment is an image decoding apparatus 31 for dividing a picture into multiple CTU rows and decoding each of the multiple CTU rows sequentially from top. The image decoding apparatus 31 includes the entropy decoding unit 301 that determines whether decoding processing in a target CTU is performed by using information of a CTU located at a position one CTU forward relative to the same position as the target CTU in the CTU row immediately above the CTU row including the target CTU or is performed by using information of a CTU located at the same position as the target CTU in the CTU row immediately above the CTU row including the target CTU, based on the size of the CTU.

Fourth Embodiment

Figure 16:
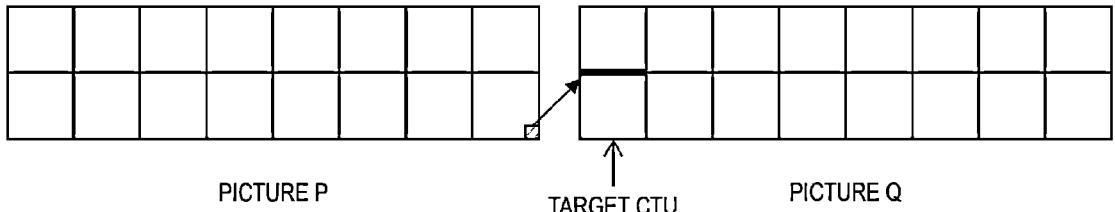
FIG. 16 is a diagram for describing processing of initializing a target picture by using a state of CABAC in a decoded picture.

In the present embodiment, as illustrated in FIG. 16, in the processing based on WPP described above, in a case that CABAC is initialized in the first CTU of the CTU row, the entropy decoding unit 301 may initialize the target CTU by referring to a state of CABAC in the last CTU in the CTU row located at the same position in a picture (picture P) that is decoded earlier than the target picture (picture Q). In this manner, even in a case that the processing based on WPP is performed, initialization can be performed by using a state of CABAC in a decoded picture. Note that it is only necessary that the decoded picture be decoded earlier than the target picture, and the decoded picture need not be a picture that precedes the target picture in display order.

Figure 17:
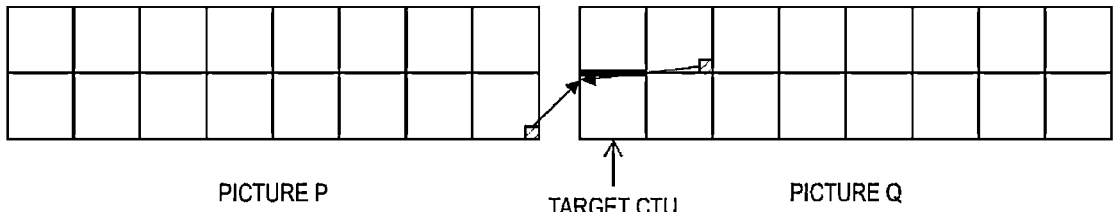
FIG. 17 is a diagram for describing processing of initializing a target picture by using a state of CABAC in a decoded picture according to the present embodiment.

Further, in the present embodiment, as illustrated in FIG. 17, in the processing based on WPP described above, the entropy decoding unit 301 performs initialization of CABAC by switching a state of CABAC in the last CTU in the same CTU row as the decoded picture (picture P) of the target picture (picture Q) and a state of CABAC in the second CTU from the start of the CTU row immediately above the target CTU in the target picture, and starts the decoding processing. In this manner, even in a case that the processing based on WPP is performed, initialization can be performed by switching a state of CABAC in a decoded picture and a state of CABAC in the CTU row immediately above the target CTU in the target picture. Note that it is only necessary that the decoded picture be decoded earlier than the target picture, and the decoded picture need not be a picture that precedes the target picture in display order.

Further, in the present embodiment, in a case that the prediction image generation unit 308 generates a prediction image by use of the intra prediction and the inter prediction, the prediction image generation unit 308 performs the intra prediction and the inter prediction by using pixel values and prediction parameters up to the CTU located at the position one CTU forward relative to the same position as the target CTU in the CTU row immediately above the target CTU (first CTU of the CTU row). For example, prediction processing may be performed by setting M to any one of 0, 0.5, and 1 with the use of the method of Processing 1 to Processing 3.

As described above, the image decoding apparatus 31 according to the present embodiment is an image decoding apparatus 31 for dividing a picture into multiple CTU rows and decoding each of the multiple CTU rows sequentially from top. In a case of generating a prediction image by use of the intra prediction and the inter prediction, the image decoding apparatus 31 includes the prediction image generation unit 308 that generates the prediction image to be used for decoding of a target CTU by using pixels up to a position one CTU forward relative to the same position as the target CTU in the CTU row (second CTU row) immediately above the CTU row (first CTU row) including the target CTU, and the entropy decoding unit 301 that performs initialization of CABAC of a first CTU of the first CTU row by using a state of CABAC in a picture decoded earlier than the target picture including the target CTU or the entropy decoding unit 301 that performs initialization of CABAC of a first CTU of the CTU row by switching a state of CABAC in the picture decoded earlier than the target picture including the target CTU and a state of CABAC of the CTU located at the same position as the target CTU in the CTU row immediately above the CTU row including the target CTU.

Fifth Embodiment

In the present embodiment, whether initialization is performed by using a state of CABAC of a decoded picture, which has been described in the above-described fourth embodiment, or a state of CABAC of a CTU located at the same position in the CTU row immediately above the target CTU or located at a position one CTU forward relative to the same position is selected.

Specifically, a flag wpp_cabac_init_prev_pic_flag indicating whether initialization is to be performed by using a state of CABAC of a decoded picture is performed, or a state of CABAC of the CTU located at the same position in the CTU row immediately above the target CTU or located at a position one CTU forward relative to the same position is used is included in coded data such as the SPS, the PPS, and the slice header. And the entropy decoding unit 301 performs initialization of CABAC by using a state specified by the flag. For example, in a case that wpp_cabac_init_prev_pic_flag=0, initialization is performed by using a state of CABAC in the CTU row immediately above the CTU row including the target CTU in the target picture, and in a case that wpp_cabac_init_prev_pic_flag=1, initialization is performed by using a state of CABAC of a previously decoding picture.

As described above, the image decoding apparatus 31 according to the present embodiment is an image decoding apparatus for dividing a picture into multiple CTU rows and decoding each of the multiple CTU rows sequentially from top. The image decoding apparatus 31 includes the entropy decoding unit 301 that decodes information indicating whether initialization of CABAC in the CTU row is to be performed by using a state of CABAC of a picture decoded earlier than a target picture including a target CTU or be performed by using a state of CABAC of the CTU in the CTU row immediately above the CTU row including the target CTU.

APPLICATION EXAMPLES

The above-mentioned image coding apparatus 11 and the image decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

First, referring to FIG. 18, it will be described that the above-mentioned image coding apparatus 11 and the image decoding apparatus 31 can be utilized for transmission and reception of videos.

Figure 18:
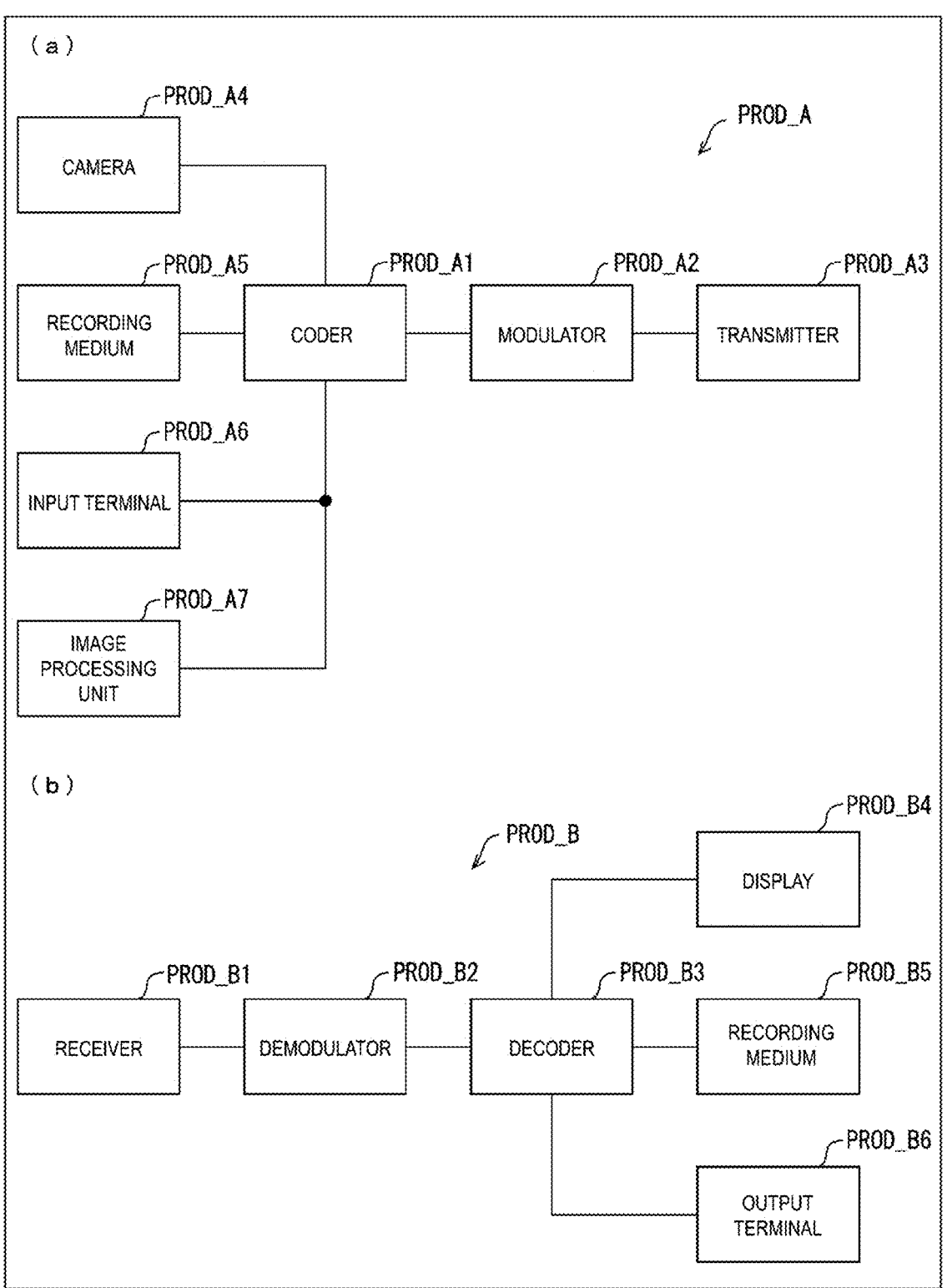
FIG. 18 is a diagram illustrating configurations of a transmitting apparatus equipped with the image coding apparatus and a receiving apparatus equipped with the image decoding apparatus according to the present embodiment. (a) thereof illustrates the transmitting apparatus equipped with the image coding apparatus, and (b) thereof illustrates the receiving apparatus equipped with the image decoding apparatus.

(a) of FIG. 18 is a block diagram illustrating a configuration of a transmitting apparatus PROD_A installed with the image coding apparatus 11. As illustrated in (a) of FIG. 18, the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned image coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in (a) of FIG. 18, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

(b) of FIG. 18 is a block diagram illustrating a configuration of a receiving apparatus PROD_B installed with the image decoding apparatus 31. As illustrated in (b) of FIG. 18, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned image decoding apparatus 31 is utilized as the decoding unit PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in (b) of FIG. 18, some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B. Next, referring to FIG. 19, it will be described that the above-mentioned image coding apparatus 11 and the image decoding apparatus 31 can be utilized for recording and regeneration of videos.

Figure 19:
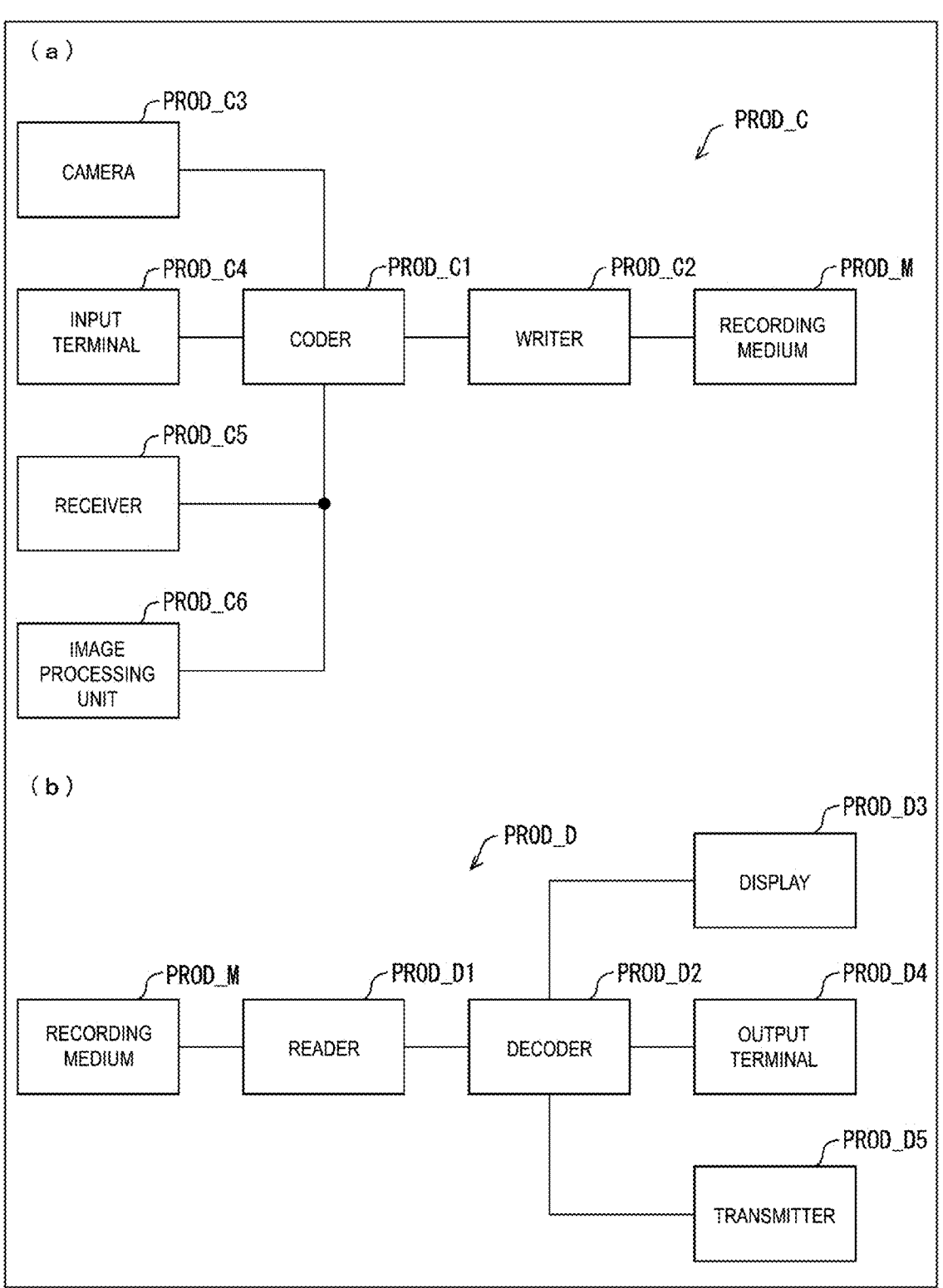
FIG. 19 is a diagram illustrating configurations of a recording apparatus equipped with the image coding apparatus and a reconstruction apparatus equipped with the image decoding apparatus according to the present embodiment. (a) thereof illustrates the recording apparatus equipped with the image coding apparatus, and (b) thereof illustrates the reconstruction apparatus equipped with the image decoding apparatus.

(a) of FIG. 19 is a block diagram illustrating a configuration of a recording apparatus PROD_C installed with the above-mentioned image coding apparatus 11. As illustrated in (a) of FIG. 19, the recording apparatus PROD_C includes a coder PROD_C1 that obtains coded data by coding a video, and a writing unit PROD_C2 that writes the coded data obtained by the coder PROD_C1 in a recording medium PROD_M. The above-mentioned image coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in (a) of FIG. 19, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

(b) of FIG. 19 is a block illustrating a configuration of a reconstruction apparatus PROD_D installed with the above-mentioned image decoding apparatus 31. As illustrated in (b) of FIG. 19, the reconstruction apparatus PROD_D includes a reading unit PROD_D1 which reads coded data written in the recording medium PROD_M, and a decoder PROD_D2 which obtains a video by decoding the coded data read by the reader PROD_D1. The above-mentioned image decoding apparatus 31 is utilized as the decoding unit PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in (b) of FIG. 19, some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned image decoding apparatus 31 and the image coding apparatus 11 may be realized as a hardware by a logical circuit formed on an integrated circuit (IC chip), or may be realized as a software using a Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. In addition, an objective of the embodiments of the present disclosure can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or a MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present disclosure can be also realized in the form of computer data signals embedded in a carrier such that the transmission of the program codes is embodied in electronic transmission.

The embodiments of the present disclosure are not limited to the above-described embodiments, and various modifications are possible within the scope of the claims. That is, an embodiment obtained by combining technical means modified appropriately within the scope defined by claims is included in the technical scope of the present disclosure as well.

CROSS-REFERENCE OF RELATED APPLICATION

This application claims the benefit of priority to JP 2018-106506 filed on Jun. 1, 2018, which is incorporated herein by reference in its entirety.

REFERENCE SIGNS LIST

11 Image coding apparatus
31 Image decoding apparatus
101, 308 Prediction image generation unit
104 Entropy encoder (coder)
301 Entropy decoding unit (decoder)

The invention claimed is:

1. An image decoding apparatus for decoding a flag indicating whether or not Wavefront Parallel Processing (WPP) is performed, and decoding a picture based on the WPP, the image decoding apparatus comprising:

a prediction parameter decoding circuit configured to determine whether or not a neighboring region is available for a target region;

a prediction image generation circuit configured to generate a prediction image by using an intra prediction referring the neighboring region; and an entropy decoding circuit configured to initialize a context adaptive binary arithmetic coding (CABAC) state of a target coding tree unit (CTU), decode the target CTU, and store the CABAC state of the target CTU, wherein the prediction image generation circuit, in a case that the flag indicates that the WPP is performed, generates the prediction image by referring an image up to a position xCTU+wCTU*1−1 in a line above the target CTU, the xCTU is an x coordinate of the target CTU, and the wCTU is a width of a CTU, and the entropy decoding circuit, in a case that the flag indicates that the WPP is performed and the target CTU is located at a beginning position in a CTU row, initializes the CABAC state of the target CTU by using a stored CABAC state of a neighboring CTU immediately above the target CTU and stores the CABAC state of the target CTU.

2. An image coding apparatus for coding a flag indicating whether or not Wavefront Parallel Processing (WPP) is performed, and coding a picture based on the WPP, the image coding apparatus comprising:

a prediction parameter coding circuit configured to determine whether or not a neighboring region is available for a target region;

a prediction image generation circuit configured to generate a prediction image by using an intra prediction referring the neighboring region; and an entropy coding circuit configured to initialize a context adaptive binary arithmetic coding (CABAC) state of a target coding tree unit (CTU), code the target CTU, and store the CABAC state of the target CTU, wherein the prediction image generation circuit, in a case that the flag indicates that the WPP is performed, generates the prediction image by referring an image up to a position xCTU+wCTU*1−1 in a line above the target CTU, the xCTU is an x coordinate of the target CTU, and the wCTU is a width of a CTU, and the entropy coding circuit, in a case that the flag indicates that the WPP is performed and the target CTU is located at a beginning position in a CTU row, initializes the CABAC state of the target CTU by using a stored CABAC state of a neighboring CTU immediately above the target CTU and stores the CABAC state of the target CTU.

3. A non-transitory computer-readable recording medium storing a program for making a computer decode a flag indicating whether or not Wavefront Parallel Processing (WPP) is performed, and decode a picture based on the WPP, wherein the program makes the computer:

determine whether or not a neighboring region is available for a target region;

in a case that the flag indicates that the WPP is performed, generate a prediction image by referring an image up to a position $xCTU+wCTU*1-1$ in a line above the target CTU, wherein the xCTU is an x coordinate of the target CTU, and the wCTU is a width of a CTU; and in a case that the flag indicates that the WPP is performed and a target coding tree unit (CTU) is located at a beginning position in a CTU row, initialize a context adaptive binary arithmetic coding (CABAC) state of the target CTU by using a stored CABAC state of a neighboring CTU immediately above the target CTU, decode the target CTU, and store the CABAC state of the target CTU.

\* \* \* \* \*